US012707532B2

(12) United States Patent
Chen et al.

(10) Patent No.: US 12,707,532 B2
(45) Date of Patent: Aug. 11, 2026

(54) DISCONTINUOUS RECEPTION METHOD AND APPARATUS

(71) Applicant: HUAWEI TECHNOLOGIES CO., LTD., Shenzhen (CN)

(72) Inventors: Erkai Chen, Kista (SE); Shuri Liao, Shanghai (CN); Shengyue Dou, Shanghai (CN); Shulan Feng, Beijing (CN); Lixia Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 18/430,836

(22) Filed: Feb. 2, 2024

(65) Prior Publication Data

US 2024/0172322 A1 May 23, 2024

Related U.S. Application Data

(63) Continuation of application No. PCT/CN2022/089271, filed on Apr. 26, 2022.

(30) Foreign Application Priority Data

Aug. 4, 2021 (CN) ......................... 202110892022.3

(51) Int. Cl.
*H04W 76/28* (2018.01)
*H04L 5/00* (2006.01)
*H04W 52/02* (2009.01)

(52) U.S. Cl.
CPC ........... *H04W 76/28* (2018.02); *H04L 5/0053* (2013.01); *H04W 52/02* (2013.01);
(Continued)

(58) Field of Classification Search
CPC . H04W 76/28; H04W 52/02; H04W 52/0216; H04W 52/0229; H04L 5/0053
See application file for complete search history.

(56) References Cited

U.S. PATENT DOCUMENTS

2014/0119255 A1* 5/2014 Vannithamby .... H04W 72/0446 370/311
2019/0098689 A1 3/2019 Wei et al.
(Continued)

FOREIGN PATENT DOCUMENTS

WO 2021016766 A1 2/2021

OTHER PUBLICATIONS

Kim, et al., Evolution of Power Saving Technologies for 5G New Radio, IEEE Access, vol. 8, 2020, Nov. 12, 2020, p. 198912-198924, 13 Pages, (Year: 2020).*

*Primary Examiner* — Michael A Keller
*Assistant Examiner* — Chhian (Amy) Ling
(74) *Attorney, Agent, or Firm* — Rimon PC

(57) ABSTRACT

A method and an apparatus are provided. In the method, first discontinuous reception DRX configuration information is obtained; first cycle duration T1 of a first DRX cycle, a quantity N1 of first on-duration periods in the first DRX cycle, and duration of the first on-duration period are obtained based on the first DRX configuration information, where T1>0 and N1>0; and a physical downlink control channel PDCCH is monitored in one or more first on-duration periods in the first DRX cycle based on the first cycle duration T1, the quantity N1 of first on-duration periods, and the duration of the first on-duration period. According to the method, an on-duration period in a DRX cycle can match an arrival cycle of data.

9 Claims, 7 Drawing Sheets

1000

Radio access network device

Terminal

1010: First DRX configuration information

1020: Obtain first cycle duration T1 of a first DRX cycle, a quantity N1 of first on-duration periods in the first DRX cycle, and duration of the first on-duration period 1030: Monitor a PDCCH in one or more first on-duration periods in the first DRX cycle based on the first cycle duration T1, the quantity N1 of first on-duration periods, and the duration of the first on-duration period

(52) U.S. Cl.
CPC ... *H04W 52/0216* (2013.01); *H04W 52/0229* (2013.01); *Y02D 30/70* (2020.08)

(56) References Cited

U.S. PATENT DOCUMENTS

| | | | | |
|---|---|---|---|---|
| 2021/0014927 | A1 | 1/2021 | Tang | |
| 2021/0274465 | A1* | 9/2021 | Huang | H04W 24/08 |
| 2022/0256622 | A1* | 8/2022 | Li | H04W 76/28 |

* cited by examiner

DISCONTINUOUS RECEPTION METHOD AND APPARATUS

CROSS-REFERENCE TO RELATED APPLICATIONS

This application is a continuation of International Application No. PCT/CN2022/089271, filed on Apr. 26, 2022, which claims priority to Chinese Patent Application No. 202110892022.3, filed on Aug. 4, 2021. The disclosures of the aforementioned applications are hereby incorporated by reference in their entireties.

TECHNICAL FIELD

This application relates to the field of communication technologies, and in particular, to a discontinuous reception method and apparatus.

BACKGROUND

In wireless communication networks, the extended reality (XR) technology provides advantages such as multiple views and strong interactivity, that can provide brand-new visual experience for users, and therefore offers great application value and commercial potential. XR includes technologies such as virtual reality (VR), augmented reality (AR), and mixed reality (MR), and can be widely applied to many fields such as entertainment, gaming, medical care, advertising, industry, online education, and engineering.

Terminals that receive XR data are generally sensitive to power consumption. Therefore, how to enable terminals to receive the XR data with lower power consumption is an urgent problem to be resolved.

SUMMARY

According to a first aspect, an embodiment of this application provides a communication method. The method may be performed by a terminal, a component (for example, a processor, a chip, or a chip system) of the terminal, or a logical module or software that can implement all or some functions of the terminal. The method includes: obtaining first discontinuous reception DRX configuration information; obtaining a first cycle duration T1 of a first DRX cycle, a quantity N1 of first on-duration periods in the first DRX cycle, and a duration of the first on-duration period based on the first DRX configuration information, where T1>0 and N1>0; and monitoring a physical downlink control channel PDCCH in one or more first on-duration periods in the first DRX cycle based on the first cycle duration T1, the quantity N1 of first on-duration periods, and the duration of the first on-duration period.

Optionally, the first DRX configuration information is carried in a radio resource control RRC message.

Optionally, the first cycle duration T1 is 25 ms, 50 ms, 100 ms, an integer multiple of 25 ms, an integer multiple of 50 ms, an integer multiple of 100 ms, or the like.

Optionally, the quantity N1 of first on-duration periods is an integer multiple of 3. For example, N1 may be 3, 6, or 9.

According to the method, an on-duration period in a DRX cycle can match an arrival cycle of data without introducing a DRX cycle duration of non-integer milliseconds. In this way, a probability that the terminal misses detecting the PDCCH can be reduced, thereby improving the data receiving and sending performance of the terminal.

With reference to the first aspect, in some implementations of the first aspect, the method further includes: obtaining, based on the first DRX configuration information, a first start offset A1 and a first slot offset that corresponds to the first DRX cycle, where A1≥0. The monitoring a PDCCH in one or more first on-duration periods in the first DRX cycle based on the first cycle duration T1, the quantity N1 of first on-duration periods, and the duration of the first on-duration period includes: monitoring the PDCCH in the one or more first on-duration periods in the first DRX cycle based on the first cycle duration T1, the quantity N1 of first on-duration periods, the duration of the first on-duration period, the first start offset A1, and the first slot offset.

With reference to the first aspect, in some implementations of the first aspect, the monitoring the PDCCH in the one or more first on-duration periods in the first DRX cycle based on the first cycle duration T1, the quantity N1 of first on-duration periods, the duration of the first on-duration period, the first start offset A1, and the first slot offset includes: obtaining a start time of the one or more first on-duration periods in the first DRX cycle based on the first cycle duration T1, the quantity N1 of first on-duration periods, the first start offset A1, and the first slot offset; and monitoring the PDCCH in the one or more first on-duration periods in the first DRX cycle based on the start time of the one or more first on-duration periods and the duration of the first on-duration period.

Optionally, a start subframe of an $i^{th}$ first on-duration period in the first DRX cycle satisfies:

$$((SFN1\times 10)+SF1)\bmod(T1)=\left(A1+\lfloor (i-1)*T1/N1\rfloor\right)\bmod(T1);$$

$$((SFN1\times 10)+SF1)\bmod(T1)=\left(A1+(i-1)*\lfloor T1/N1\rfloor\right)\bmod(T1);$$

$$((SFN1\times 10)+SF1)\bmod(T1)=\left(A1+\lceil (i-1)*T1/N1\rceil\right)\bmod(T1);\text{ or}$$

$$((SFN1\times 10)+SF1)\bmod(T1)=\left(A1+(i-1)*\lceil T1/N1\rceil\right)\bmod(T1).$$

SF1 represents a number of the start subframe, SFN1 represents a number of a system frame in which the start subframe is located, SF1 and SFN1 are integers greater than or equal to 0, and 1≤i≤N1. Start time of the $i^{th}$ first on-duration period in the first DRX cycle is obtained based on the start subframe and the first slot offset. For example, the first slot offset exists between the start time of the $i^{th}$ first on-duration period in the first DRX cycle and the start time of the start subframe SF1.

In the implementation, on-duration periods may be distributed as evenly as possible in a DRX cycle, so that the on-duration period in the DRX cycle can match an arrival cycle of data. In this way, a probability that the terminal misses detecting the PDCCH can be reduced, thereby improving the data receiving and sending performance of the terminal.

According to a second aspect, an embodiment of this application provides a communication method. The method may be performed by a terminal, a component (for example, a processor, a chip, or a chip system) of the terminal, or a logical module or software that can implement all or some functions of the terminal. The method includes: obtaining second DRX configuration information; obtaining, based on the second DRX configuration information, second cycle duration T2 of a second DRX cycle, a second start offset A2 and an offset adjustment amount Q that corresponds to the second DRX cycle, and a duration of a second on-duration period in the second DRX cycle, where T2>0, A2≥0, and $Q \geq 0$; and monitoring a PDCCH in the second on-duration period in the second DRX cycle based on the second cycle duration T2, the second start offset A2, the offset adjustment amount Q, and the duration of the second on-duration period.

Optionally, the second DRX configuration information is carried in an RRC message.

Optionally, the second cycle duration T2 is 8 ms, 10 ms, 11 ms, 16 ms, 32 ms, 33 ms, an integer multiple of 8 ms, an integer multiple of 10 ms, an integer multiple of 11 ms, an integer multiple of 16 ms, an integer multiple of 32 ms, an integer multiple of 33 ms, or the like.

Optionally, the offset adjustment amount Q is 1/9 ms (0.11 ms), 1/3 ms (0.33 ms), 2/3 ms (0.67 ms), 4/3 ms (1.33 ms), 10/9 ms (1.11 ms), an integer multiple of 1/9 ms, an integer multiple of 1/3 ms, an integer multiple of 2/3 ms, an integer multiple of 4/3 ms, an integer multiple of 10/9 ms, or the like.

According to the method, an on-duration period in a DRX cycle can match an arrival cycle of data. In this way, a probability that the terminal misses detecting the PDCCH can be reduced, thereby improving the data receiving and sending performance of the terminal.

With reference to the second aspect, in some implementations of the second aspect, the method further includes: obtaining, based on the second DRX configuration information, a second slot offset corresponding to the second DRX cycle. The monitoring a PDCCH in the second on-duration period in the second DRX cycle based on the second cycle duration T2, the second start offset A2, the offset adjustment amount Q, and the duration of the second on-duration period includes: monitoring the PDCCH in the second on-duration period in the second DRX cycle based on the second cycle duration T2, the second start offset A2, the offset adjustment amount Q, the second slot offset, and the duration of the second on-duration period.

With reference to the second aspect, in some implementations of the second aspect, the monitoring the PDCCH in the second on-duration period in the second DRX cycle based on the second cycle duration T2, the second start offset A2, the offset adjustment amount Q, the second slot offset, and the duration of the second on-duration period includes: obtaining a start time of the second on-duration period in the second DRX cycle based on the second cycle duration T2, the second start offset A2, the offset adjustment amount Q, and the second slot offset; and monitoring the PDCCH in the second on-duration period in the second DRX cycle based on the start time of the second on-duration period and the duration of the second on-duration period.

Optionally, the second DRX cycle is identified by a positive integer j, and a start subframe of the second on-duration period in the second DRX cycle satisfies:

$$((SFN2\times 10)+SF2)\bmod(T2)=(A2+\lfloor (j-1)*Q\rfloor)\bmod(T2);$$

$$((SFN2\times 10)+SF2)\bmod(T2)=\lfloor A2+(j-1)*Q\rfloor\bmod(T2);$$

$$((SFN2\times 10)+SF2)\bmod(T2)=(A2+\lceil (j-1)*Q\rceil)\bmod(T2);\text{ or}$$

$$((SFN2\times 10)+SF2)\bmod(T2)=\lceil A2+(j-1)*Q\rceil\bmod(T2).$$

SF2 represents a number of the start subframe, SFN2 represents a number of a system frame in which the start subframe is located, and SF2 and SFN2 are integers greater than or equal to 0. The start time of the second on-duration period in the second DRX cycle is obtained based on the start subframe and the second slot offset. For example, the second slot offset exists between the start time of the second on-duration period in the second DRX cycle and the start time of the start subframe SF2.

In the implementation, on-duration periods may be distributed as evenly as possible in a DRX cycle, so that the on-duration period in the DRX cycle can match an arrival cycle of data. In this way, a probability that the terminal misses detecting the PDCCH can be reduced, thereby improving the data receiving and sending performance of the terminal.

According to a third aspect, an embodiment of this application provides an apparatus, to implement the method according to any one of the first aspect, the second aspect, the possible implementations of the first aspect, or the possible implementations of the second aspect. The apparatus includes a corresponding unit or module configured to perform the foregoing method. The unit or module included in the apparatus may be implemented by software and/or hardware. The apparatus may be, for example, a terminal, or may be a chip, a chip system, or a processor that supports the terminal in implementing the foregoing method, or may be a logical module or software that can implement all or some functions of the terminal.

According to a fourth aspect, an embodiment of this application provides an apparatus, including a processor. The processor is coupled to a memory, the memory is configured to store instructions, and when the instructions are executed by the processor, the apparatus is enabled to implement the method according to any one of the first aspect, the second aspect, the possible implementations of the first aspect, or the possible implementations of the second aspect.

According to a fifth aspect, an embodiment of this application provides a computer-readable storage medium. The computer-readable storage medium stores instructions, and when the instructions are executed, a computer is enabled to perform the method according to any one of the first aspect, the second aspect, the possible implementations of the first aspect, or the possible implementations of the second aspect.

According to a sixth aspect, an embodiment of this application provides a computer program product. The computer program product includes computer program code. When the computer program code is run on a computer, the computer is enabled to perform the method according to any one of the first aspect, the second aspect, the possible implementations of the first aspect, or the possible implementations of the second aspect.

According to a seventh aspect, an embodiment of this application provides a chip, including a processor. The processor is coupled to a memory, the memory is configured to store instructions, and when the instructions are executed by the processor, the chip is enabled to implement the method according to any one of the first aspect, the second aspect, the possible implementations of the first aspect, or the possible implementations of the second aspect.

According to an eighth aspect, an embodiment of this application provides a system, to implement the method according to any one of the first aspect, the second aspect, the possible implementations of the first aspect, or the possible implementations of the second aspect. The system includes a corresponding unit or module configured to perform the foregoing method. The unit or module included in the system may be implemented by software and/or hardware. The system may be, for example, a terminal, or may be a chip, a chip system, or a processor that supports the terminal in implementing the foregoing method, or may be a logical module or software that can implement all or some functions of the terminal.

DESCRIPTION OF EMBODIMENTS

Figure 1:
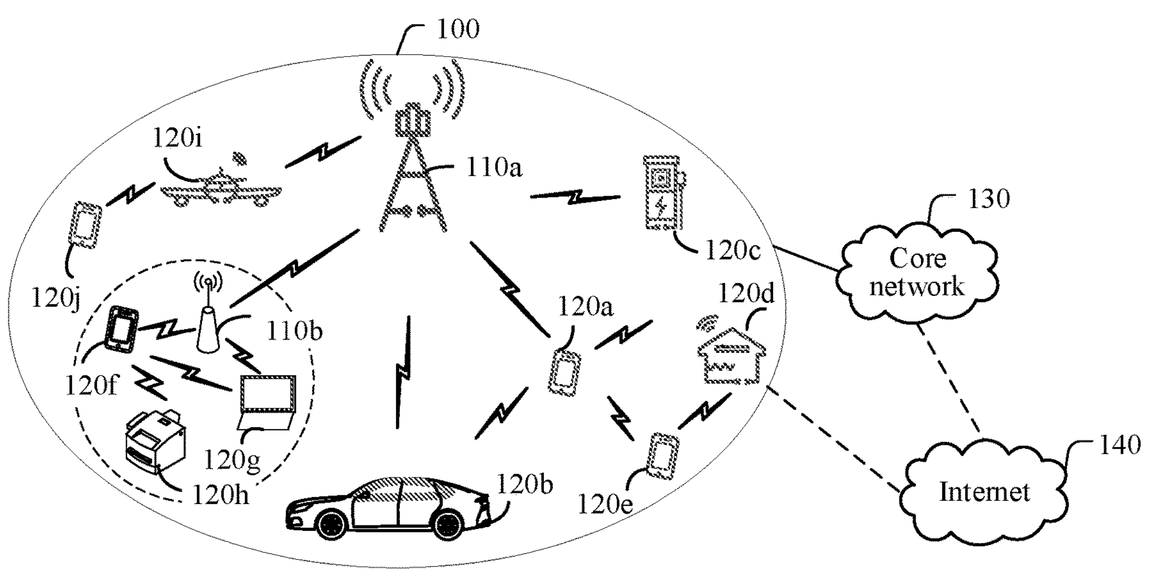
FIG. 1 is a schematic diagram of a communication system to which an embodiment provided in this application is applied.

FIG. 1 is a schematic architectural diagram of a communication system to which an embodiment of this application is applied. As shown in FIG. 1, the communication system includes a radio access network 100 and a core network 130. Optionally, the communication system 100 may further include an internet 140. The radio access network 100 may include at least one radio access network device (for example, 110*a* and 110*b* in FIG. 1), and may further include at least one terminal (for example, 120*a* to 120*j* in FIG. 1). The terminal is connected to the radio access network device in a wireless manner, and the radio access network device is connected to the core network in the wireless manner or a wired manner. A core network device and the radio access network device may be independent and different devices, or functions of the core network device and logical functions of the radio access network device are integrated into a same device, or some functions of the core network device and some functions of the radio access network device are integrated into one device. The wired or wireless manner may be used for connection between terminals and between radio access network devices. FIG. 1 is merely a schematic diagram. The communication system may further include another network device, for example, may further include a relay device and a backhaul device, which are not shown in FIG. 1.

A method and an apparatus that are provided in embodiments of this application may be used in various communication systems, for example, a 4$^{th}$ generation (4G) communication system, a 4.5G communication system, a 5G communication system, a 5.5G communication system, a 6G communication system, a system integrating a plurality of communication systems, or a future evolved communication system. The various communication systems are, for example, a long term evolution (LTE) system, a new radio (NR) system, a wireless fidelity (Wi-Fi) system, a 3$^{rd}$ generation partnership project (3GPP)-related communication system, and another communication system of this type.

The radio access network device may be a base station, an evolved NodeB (eNodeB), a transmission reception point (TRP), a next generation NodeB (gNB) in a 5G mobile communication system, a next generation base station in a 6G mobile communication system, a base station in a future mobile communication system, an access node in the Wi-Fi system, or the like; or may be a module or a unit that completes some functions of a base station, for example, may be a central unit (CU) or a distributed unit (DU). The radio access network device may be a macro base station (for example, 110*a* in FIG. 1), or may be a micro base station or an indoor base station (for example, 110*b* in FIG. 1), or may be a relay node or a donor node. It may be understood that all or some functions of the radio access network device in this application may also be implemented by using a software function running on hardware, or may be implemented by using a virtualization function instantiated on a platform (for example, a cloud platform). A specific technology and a specific device form that are used by the radio access network device are not limited in embodiments of this application. For ease of description, the following provides descriptions by using an example in which the base station is used as the radio access network device.

The terminal may also be referred to as a terminal device, user equipment (UE), a mobile station, a mobile terminal, or the like. The terminal may be widely applied to various scenarios, for example, device-to-device (D2D), vehicle to everything (V2X) communication, machine type communication (MTC), internet of things (IoT), virtual reality, augmented reality, industrial control, autonomous driving, telemedicine, a smart grid, smart furniture, smart office, smart wearable, smart transportation, and a smart city. The terminal may be a mobile phone, a tablet computer, a computer with a wireless transceiver function, a wearable device, a vehicle, an uncrewed aerial vehicle, a helicopter, an airplane, a ship, a robot, a robot arm, a smart home device, or the like. A specific technology and a specific device form that are used by the terminal are not limited in embodiments of this application.

Alternatively, the terminal in this application may be a VR terminal, an AR terminal, or an MR terminal. The VR terminal, the AR terminal, and the MR terminal each may be referred to as an XR terminal. The XR terminal may be, for example, a head-mounted device (for example, a helmet or glasses), or may be an all-in-one machine, or may be a television, a display, a car, a vehicle-mounted device, a tablet, or a smart screen. The XR terminal can present XR data to a user, and the user can experience diversified XR services by wearing or using the XR terminal. The XR terminal may access a network in the wireless or wired manner, for example, access the network by using the Wi-Fi system, the 5G system, or another system.

The base station and the terminal may be fixed or movable. The base station and the terminal may be deployed on the land, including indoor or outdoor, handheld or vehicle-mounted; may be deployed on the water; or may be deployed on an airplane, a balloon, and an artificial satellite in the air. Application scenarios of the base station and the terminal are not limited in embodiments of this application.

Roles of the base station and the terminal may be relative. For example, the airplane or uncrewed aerial vehicle 120*i* in FIG. 1 may be configured as a mobile base station. For the terminal 120*j* that accesses the radio access network 100 through 120*i*, the terminal 120*i* is a base station. However, for the base station 110*a*, 120*i* is a terminal, that is, 110*a* and 120*i* communicate with each other by using a radio air interface protocol. Certainly, 110*a* and 120*i* may alternatively communicate with each other by using an interface protocol between base stations. In this case, for 110*a*, 120*i* is also a base station. Therefore, both the base station and the terminal may be collectively referred to as communication apparatuses. 110*a* and 110*b* in FIG. 1 may be referred to as communication apparatuses having a function of the base station, and 120*a* to 120*j* in FIG. 1 may be referred to as communication apparatuses having a function of the terminal.

Communication may be performed between the base station and the terminal, between the base stations, and between the terminals by using a licensed spectrum, an unlicensed spectrum, or both the licensed spectrum and the unlicensed spectrum. Communication may be performed by using a spectrum below 6 gigahertz (GHz), a spectrum above 6 GHz, or both the spectrum below 6 GHz and the spectrum above 6 GHz. A spectrum resource used for wireless communication is not limited in embodiments of this application.

In embodiments of this application, the function of the base station may alternatively be performed by a module (for example, a chip) in the base station, or may be performed by a control subsystem including the function of the base station. The control subsystem that includes the function of the base station herein may be a control center in the foregoing terminal application scenario, for example, the smart grid, industrial control, smart transportation, and the smart city. The function of the terminal may alternatively be performed by a module (for example, a chip or a modem) in the terminal, or may be performed by an apparatus including the function of the terminal.

In this application, the base station sends a downlink signal or downlink information to the terminal, where the downlink information is carried on a downlink channel; the terminal sends an uplink signal or uplink information to the base station, where the uplink information is carried on an uplink channel; and the terminal sends a sidelink signal or sidelink information to the terminal, where the sidelink information is carried on a sidelink channel.

An XR technology having advantages such as multiple views and strong interactivity, can provide brand-new experiences for the user, and has great application value and business potential. XR includes technologies such as VR, AR, and MR, and can be widely used in many fields such as entertainment, gaming, medical care, advertising, industry, online education, and engineering. The VR technology is mainly to render visual and audio scenarios to simulate sensory stimulation of vision and audio in the real world to the user as much as possible. The VR technology usually requires the user to wear the XR terminal (for example, the head-mounted device) to simulate vision and/or hearing of the user. The VR technology may further perform action tracking on the user, to update simulated visual and/or auditory content in a timely manner. The AR technology is mainly to provide additional visual and/or auditory information or manually generated content in a real environment perceived by the user. The user may directly (where for example, sensing, processing, and rendering are not performed) or indirectly (where for example, transferring is performed through a sensor or the like) perceive the real environment, and further enhancement processing is performed. The MR technology is to insert some virtual elements into a physical scenario, to provide an immersive experience for the user by adding these elements as a part of a real scenario.

The terminal that receives the XR data is generally sensitive to power consumption. Therefore, how to enable the terminal to receive the XR data with lower power consumption is an urgent problem to be resolved.

This application provides a discontinuous reception (DRX) method. In the method, a DRX configuration that matches an XR data cycle is performed, so that a terminal can reduce unnecessary power consumption when matching XR data receiving, to improve a battery life of the terminal in a process of receiving XR data. It may be understood that the method provided in this application does not limit a data service type to which the method is applied, and a data service type other than the XR data is also applicable.

Embodiments provided in this application are applicable to a plurality of different scenarios. FIG. 2 to FIG. 5 are schematic diagrams of several system frameworks to which embodiments of this application are applicable.

Figure 2:
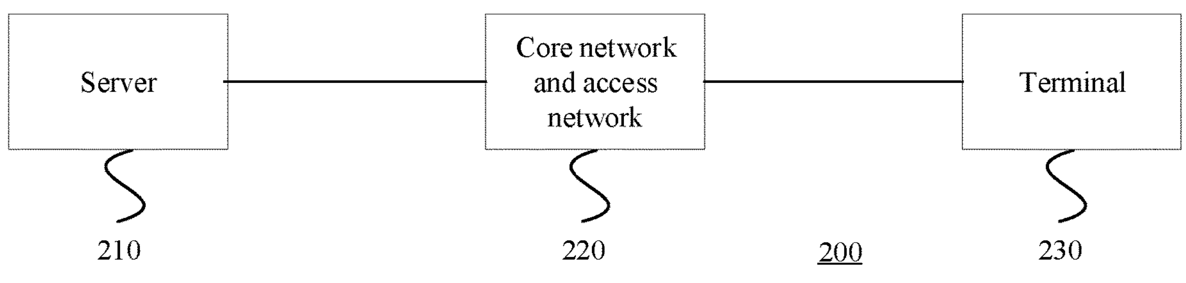
FIG. 2 to FIG. 5 are schematic diagrams of several system frameworks to which embodiments of this application are applicable.

FIG. 2 is a schematic diagram of a scenario to which an embodiment of this application is applicable. FIG. 2 shows a system 200, including a server 210, a core network and access network 220 (which may be briefly referred to as a transport network 220, for example, an LTE network, a 5G network, or a 6G network), and a terminal 230. The server 210 may be configured to: encode, decode, and render XR source data, the transport network 220 may be configured to transmit XR data, and the terminal 230 provides diversified XR experience for a user by processing the XR data. It may be understood that another apparatus may be further included between the transport network 220 and the terminal 230. For example, another terminal (for example, a mobile phone, a notebook computer, or a vehicle-mounted terminal) and/or a network device (for example, a relay device, an integrated access backhaul (IAB) device, a Wi-Fi router, or a Wi-Fi access point) may be further included. The terminal 230 obtains the XR data from the transport network 220 by using the other terminal and/or the network device.

Figure 3:
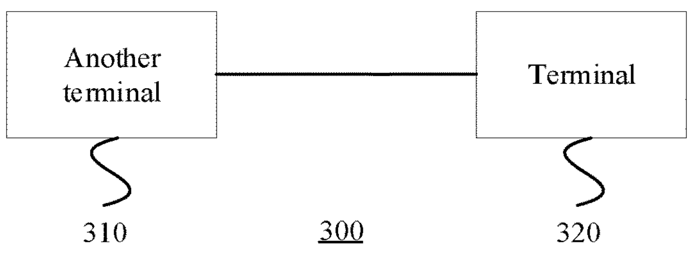

FIG. 3 is a schematic diagram of another scenario to which an embodiment of this application is applicable. FIG. 3 shows a system 300, including a terminal 320 and another terminal 310. The other terminal 310 is a terminal other than the terminal 320. The other terminal 310 may transmit XR data to the terminal 320. For example, the other terminal 310 may project the XR data to the terminal 320. For another example, the other terminal 310 and the terminal 320 are vehicle-mounted terminals, and the XR data may be exchanged between the vehicle-mounted terminals. It may be understood that the other terminal 310 may be further connected to a transport network (for example, an LTE network, a 5G network, or a 6G network), to obtain XR data from the transport network, or send data to the transport network.

Figure 4:
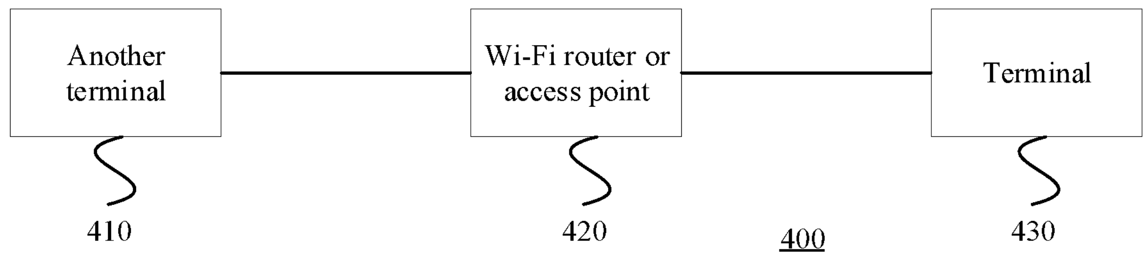

FIG. 4 is a schematic diagram of another scenario to which an embodiment of this application is applicable. FIG. 4 shows a system 400, including a terminal 430, a Wi-Fi router or Wi-Fi access point 420 (which may be briefly referred to as a Wi-Fi apparatus 420), and another terminal 410. The other terminal 410 is a terminal other than the terminal 430. The other terminal 410 may transmit XR data to the terminal 430 by using the Wi-Fi apparatus 420. For example, the other terminal 410 is a mobile phone device, the Wi-Fi apparatus 420 is the Wi-Fi router, the Wi-Fi access point, or a set-top box, and the terminal 430 is a television device, a smart screen device, or an electronic tablet device.

The mobile phone device may project the XR data to the television device, the smart screen device, or the electronic tablet device by using the Wi-Fi router, the Wi-Fi access point, or the set-top box, and present the XR data to a user.

Figure 5:
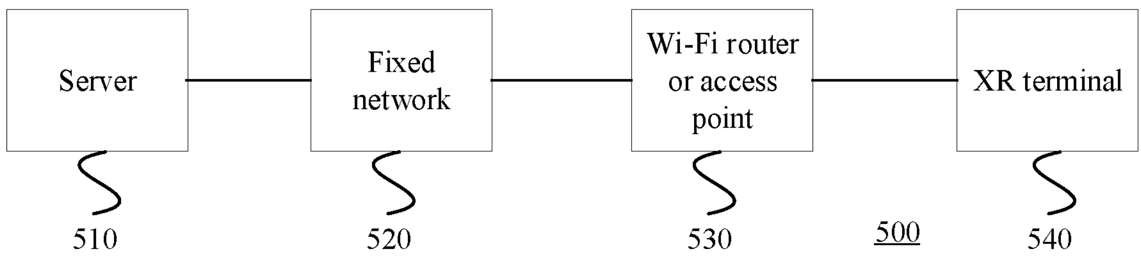

FIG. 5 is a schematic diagram of another scenario to which an embodiment of this application is applicable. FIG. 5 shows a system 500, including a server 510, a fixed network 520, a Wi-Fi router or Wi-Fi access point 530 (which may be briefly referred to as a Wi-Fi apparatus 530), and a terminal 540. The server 510 may be configured to: encode, decode, and render XR source data, and transmit XR data to the terminal 540 by using the fixed network 520 and the Wi-Fi apparatus 530. For example, the fixed network 520 is an operator network, the Wi-Fi apparatus 530 is a Wi-Fi router, a Wi-Fi access point, or a set-top box, and the server 510 transmits or projects the XR data to the terminal 540 by using the operator network 520 and the Wi-Fi apparatus 530.

It may be understood that FIG. 2 to FIG. 5 are merely examples of several scenarios to which embodiments of this application are applicable, and do not limit an applicable scenario of embodiments of this application.

The following describes technical solutions of this application with reference to the accompanying drawings.

For ease of understanding embodiments of this application, some terms and mathematical symbols in this application are first briefly described in the following table.

| | |
|---|---|
| $\lceil\ \rceil$ | Round up |
| $\lfloor\ \rfloor$ | Round down |
| x mod y | x modulo y (which may also be understood as obtaining a reminder after division of x by y) |

It may be understood that, for rounding up and rounding down in expressions in this application, if a to-be-rounded parameter is an integer, the parameter may be not rounded up or rounded down, or the integer parameter may be rounded up, or the integer parameter may be rounded down, and a same final result is obtained.

In addition, for ease of understanding the technical solutions of this application, a feature of an XR service or a video service and a DRX mechanism are first briefly described.

Figure 6:
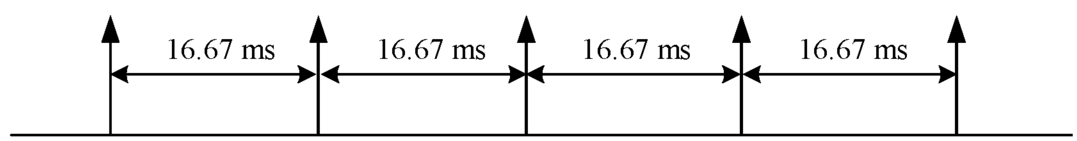
FIG. 6 is a schematic diagram of cyclic data.

XR data or video service data usually has a specific frame rate, and is cyclic. For example, FIG. 6 is a schematic diagram of distribution of picture frames of an XR service in terms of time when a frame rate is 60 frames per second (FPS). It can be learned from FIG. 6 that, in the case of 60 FPS, one picture frame appears or arrives at a spacing of 1000/60≈16.67 ms.

Other possible frame rates include 30 FPS, 90 FPS, and 120 FPS. A radio access network device may obtain the frame rate of the XR data or the video service data in a plurality of different manners.

For example, the radio access network device may obtain the frame rate of the XR data or the video service data by using configuration information of a quality of service (QoS) flow corresponding to the data, for example, a QoS profile. For another example, the radio access network device may obtain the frame rate of the XR data or the video service data by detecting an arrival time interval of a data packet in a QoS flow. For another example, a terminal may report a frame rate of uplink data or information related to the frame rate to the radio access network device by using assistance information, for example, an information element UEAssistanceInformation.

Figure 7:
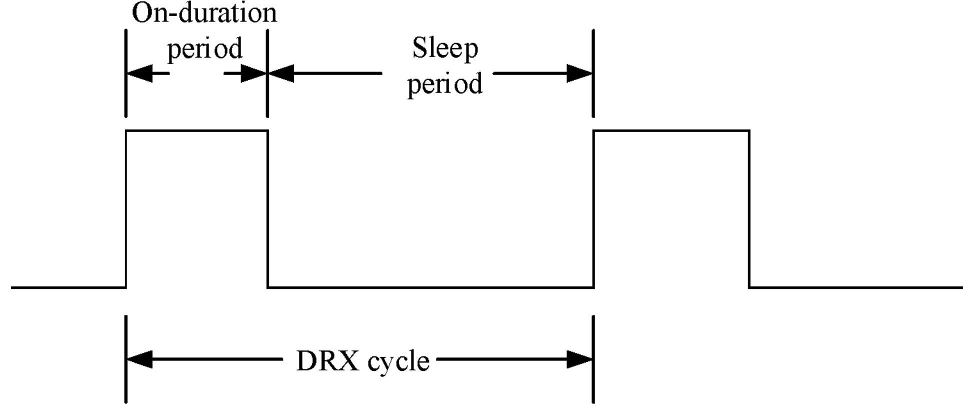
FIG. 7 and FIG. 8 are schematic diagrams of several types of DRX.

The DRX mechanism can reduce power consumption of the terminal. The DRX mechanism may be implemented by configuring an on-duration period of a DRX cycle. FIG. 7 is used as an example. The DRX cycle includes the on-duration period and a sleep period. The on-duration period may also be referred to as an awake period, an active period, an activity period, an on-duration period, or the like. A name of the on-duration period is not limited in this application. The terminal may monitor a physical downlink control channel (PDCCH) in the on-duration period. The sleep period may also be referred to as a dormancy period, an inactive period, an inactivity period, an off-duration period, or the like. A name of the sleep period is not limited in this application. The terminal does not monitor the PDCCH in the sleep period, to reduce power consumption and overheads.

Figure 8:
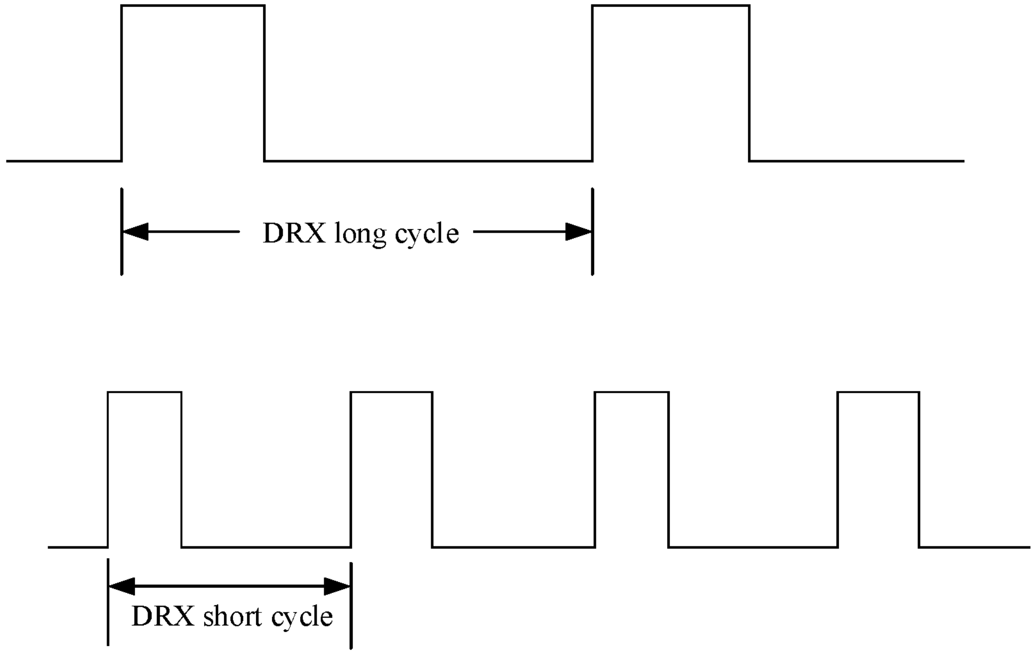

The balance between energy saving and a delay is generally considered for DRX configuration. Setting a long DRX cycle helps reduce power consumption of the terminal, but is not conducive to a quick response to data receiving and sending. Setting a short DRX cycle is more conducive to a quick response to data receiving and sending, but is not conducive to reducing power consumption of the terminal. Therefore, different DRX cycle lengths may be configured according to an actual requirement. FIG. 8 is used as an example. Two DRX cycles may be configured for the terminal: a DRX long cycle and a DRX short cycle. The configuration of the DRX long cycle is more conducive to power saving of the terminal, and the configuration of the DRX short cycle is more conducive to a quick response of the terminal to data receiving and sending. At a moment, the terminal may use one of the two DRX configurations as required. It may be understood that the DRX cycle mentioned in this application may be the DRX long cycle, or may be the DRX short cycle. This is not limited in this application.

Cycle duration of the DRX cycle is generally integer milliseconds (ms). However, because an arrival cycle of the XR data or the video service data is generally not of integer milliseconds, a problem that the cycle duration of the DRX cycle does not match the arrival cycle of the XR data is caused.

Figure 9:
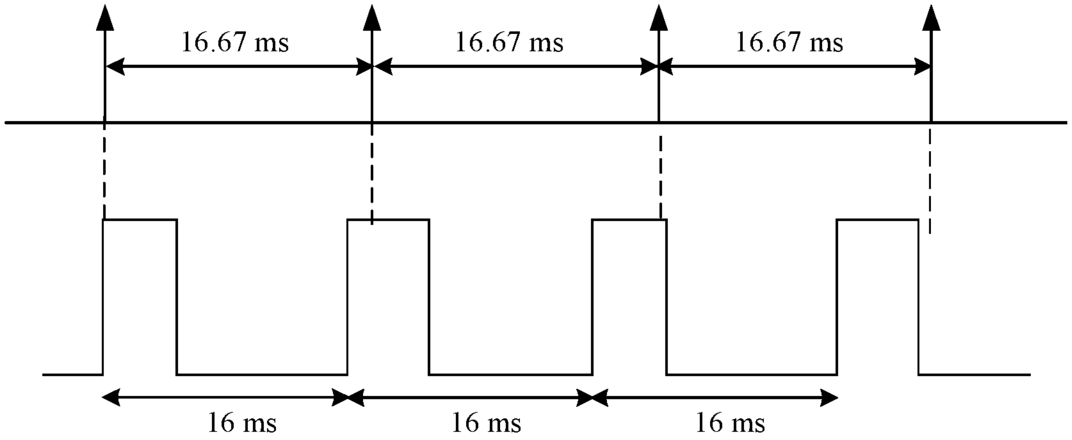
FIG. 9 is a schematic diagram in which cyclic data mismatches a DRX cycle.

FIG. 9 is used as an example for description. In FIG. 9, an example in which the frame rate of the XR data is 60 FPS (where a cycle is 16.67 ms) and the cycle duration of the DRX cycle is integer 16 ms is used. It can be learned from FIG. 9 that, because there is a difference between 16.67 ms and 16 ms, an arrival moment of the XR data may not match the on-duration period in the DRX cycle. Consequently, the terminal misses detecting a PDCCH of the XR data, and data receiving and sending performance deteriorates.

This application provides several DRX configuration methods. According to these methods, a problem that the DRX cycle does not match the arrival cycle of the XR data can be resolved without introducing a DRX cycle duration of non-integer milliseconds. It may be understood that the method provided in this application does not limit a data service type to which the method is applied, and a data service type other than the XR data is also applicable.

Figure 10:
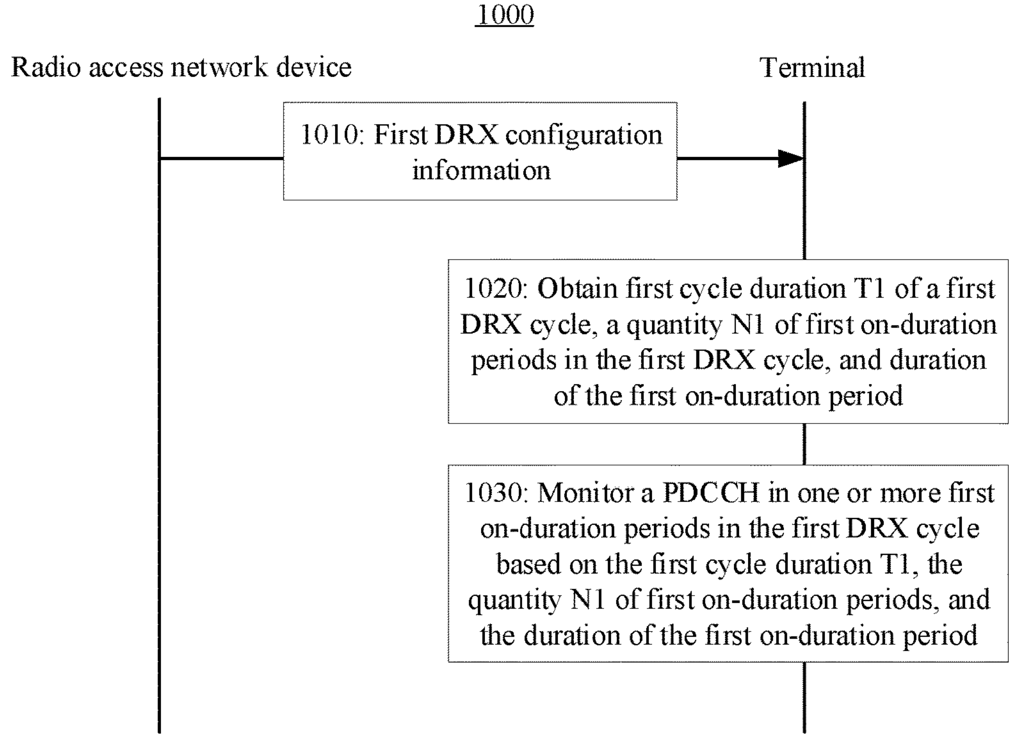
FIG. 10 is a schematic diagram of a DRX configuration method according to an embodiment of this application.

FIG. 10 is a schematic interaction diagram of a DRX configuration method 1000 according to an embodiment of this application. In FIG. 10, the method is illustrated by using an example in which a radio access network device and a terminal perform an interaction. However, an execution body of the interaction is not limited in this application. For example, the radio access network device in FIG. 10 may alternatively be a chip, a chip system, or a processor that supports the radio access network device in implementing the method, or may be a logical module or software that can implement all or some functions of the radio access network device. The terminal in FIG. 10 may alternatively be a chip, a chip system, or a processor that supports the terminal in implementing the method, or may be a logical module or software that can implement all or some functions of the terminal. As shown in FIG. 10, the method 1000 in this embodiment may include a part 1010, a part 1020, and a part 1030.

Part 1010: The radio access network device sends first DRX configuration information to the terminal, and the terminal obtains the first DRX configuration information. It may be understood that the first DRX configuration information is used for DRX configuration. The first DRX configuration information includes information about a first cycle duration T1 of a first DRX cycle, information about a quantity N1 of first on-duration periods in the first DRX cycle, and information about the duration of the first on-duration period in the first DRX cycle, where T1>0 and N1>0.

Optionally, the first DRX configuration information is carried in a radio resource control (RRC) message. It may be understood that the RRC message in this application may also be referred to as RRC signaling or RRC information. This is not limited in this application.

Optionally, the first cycle duration T1 is 25 ms, 50 ms, 100 ms, an integer multiple of 25 ms, an integer multiple of 50 ms, an integer multiple of 100 ms, or the like.

Optionally, the quantity N1 of first on-duration periods is an integer multiple of 3. For example, N1 may be 3, 6, or 9.

Part 1020: The terminal obtains the first cycle duration T1 of the first DRX cycle, the quantity N1 of first on-duration periods in the first DRX cycle, and the duration of the first on-duration period based on the first DRX configuration information.

Figure 11:
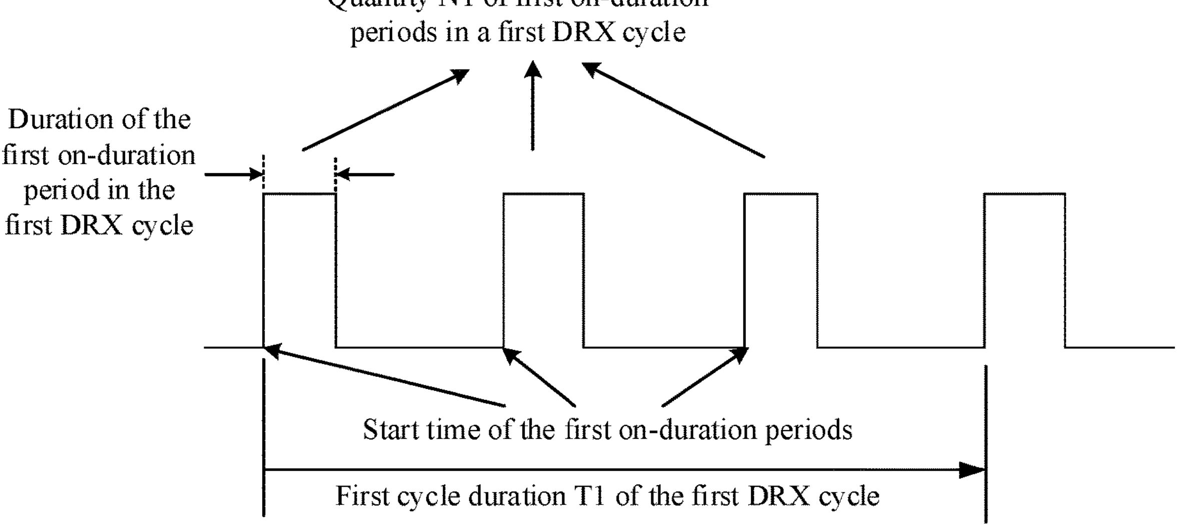
FIG. 11 is a schematic diagram of a DRX configuration according to another embodiment of this application.

FIG. 11 is used as an example to describe several DRX configuration parameters included in the first DRX configuration information. In FIG. 11, there are three first on-duration periods in the first cycle duration T1 of the first DRX cycle, that is, the quantity N1 of first on-duration periods in the first DRX cycle is equal to 3. For example, the N1 first on-duration periods in the first DRX cycle may be distributed as evenly as possible in the first cycle duration T1. The duration of all the first on-duration periods in the first DRX cycle may be the same or may be different. This is not limited in this application. In addition, FIG. 11 also shows a start time of the first on-duration period.

Part 1030: The terminal monitors a PDCCH in one or more first on-duration periods in the first DRX cycle based on the first cycle duration T1, the quantity N1 of first on-duration periods, and the duration of the first on-duration period.

According to the method 1000, an on-duration period in a DRX cycle can match an arrival cycle of XR data without introducing a DRX cycle duration of non-integer milliseconds. In this way, a probability that the terminal misses detecting the PDCCH can be reduced, thereby improving the data receiving and sending performance of the terminal.

Figure 12:
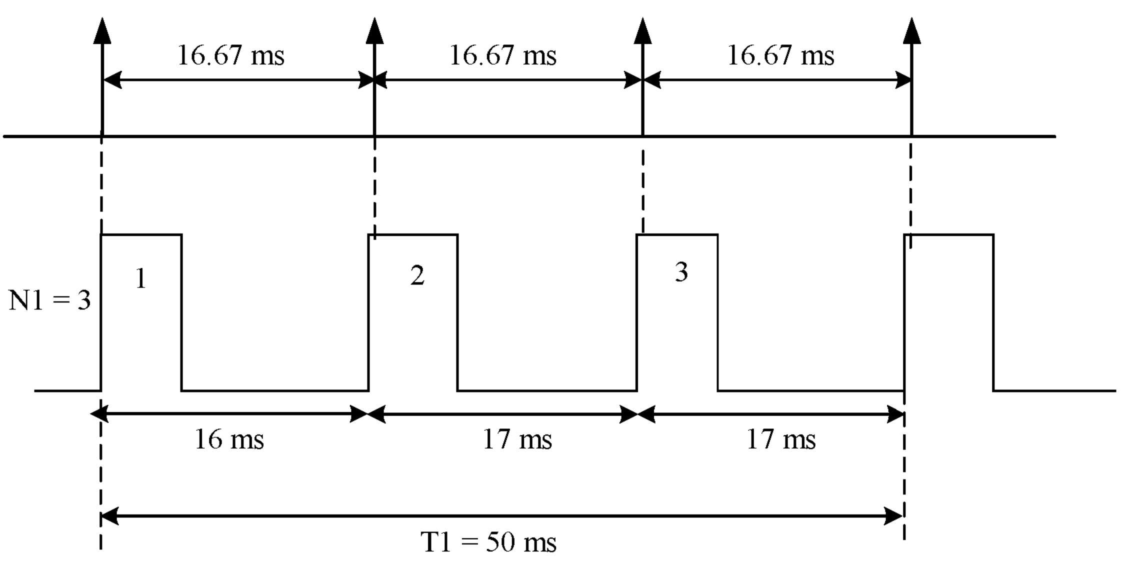
FIG. 12 is a schematic diagram in which cyclic data matches an on-duration period.

FIG. 12 is used as an example to describe how the method 1000 resolves a problem that the on-duration period in the DRX cycle does not match the arrival cycle of the XR data. In FIG. 12, a picture frame of a service whose frame rate is 60 FPS is used as an example. One picture frame appears or arrives at a spacing of 1000/60≈16.67 ms. Although one interframe spacing 16.67 ms is not an integer, three consecutive interframe spacings may last for integer 50 ms. Therefore, the first cycle duration T1 of the first DRX cycle may be configured as 50 ms, and the quantity N1 of first on-duration periods in the first DRX cycle is configured as 3. The three first on-duration periods are distributed as evenly as possible in the first cycle duration 50 ms. For example, as shown in FIG. 12, intervals of start times of the three first on-duration periods are respectively 16 ms, 17 ms, and 17 ms. In this way, the on-duration period in the DRX cycle can match the arrival cycle of the XR data. Alternatively, the first cycle duration T1 of the first DRX cycle may be configured as G1*50 ms, and the quantity N1 of first on-duration periods in the first DRX cycle is configured as G1*3, where G1 is an integer greater than or equal to 1.

In a scenario of another frame rate, according to the method 1000 provided in this application, the on-duration period in the DRX cycle can also match the arrival cycle of the XR data.

For example, a picture frame of a service whose frame rate is 30 FPS is used as an example. One picture frame appears or arrives at a spacing of 1000/30≈33.33 ms. Although one interframe spacing 33.33 ms is not an integer, three consecutive interframe spacings may last for integer 100 ms. Therefore, the first cycle duration T1 of the first DRX cycle may be configured as 100 ms, and the quantity N1 of first on-duration periods in the first DRX cycle is configured as 3. Alternatively, the first cycle duration T1 of the first DRX cycle may be configured as G2*100 ms, and the quantity N1 of first on-duration periods in the first DRX cycle is configured as G2*3, where G2 is an integer greater than or equal to 1.

For another example, a picture frame of a service whose frame rate is 90 FPS is used as an example. One picture frame appears or arrives at a spacing of 1000/90≈11.11 ms. Although one interframe spacing 11.11 ms is not an integer, nine consecutive interframe spacings may last for integer 100 ms. Therefore, the first cycle duration T1 of the first DRX cycle may be configured as 100 ms, and the quantity N1 of first on-duration periods in the first DRX cycle is configured as 9. Alternatively, the first cycle duration T1 of the first DRX cycle may be configured as G3*100 ms, and the quantity N1 of first on-duration periods in the first DRX cycle is configured as G3*9, where G3 is an integer greater than or equal to 1.

For example, a picture frame of a service whose frame rate is 120 FPS is used as an example. One picture frame appears or arrives at a spacing of 1000/120≈8.33 ms. Although one interframe spacing 8.33 ms is not an integer, three consecutive interframe spacings may last for integer 25 ms. Therefore, the first cycle duration T1 of the first DRX cycle may be configured as 25 ms, and the quantity N1 of first on-duration periods in the first DRX cycle is configured as 3. Alternatively, the first cycle duration T1 of the first DRX cycle may be configured as G4*25 ms, and the quantity N1 of first on-duration periods in the first DRX cycle is configured as G4*3, where G4 is an integer greater than or equal to 1.

The following Table 1 schematically provides configurations of T1 and N1 at several frame rates, where G1, G2, G3, and G4 are integers greater than or equal to 1.

TABLE 1

| Frame rate | T1 | N1 |
|---|---|---|
| 30 FPS | G2 * 100 ms | G2 * 3 |
| 60 FPS | G1 * 50 ms | G1 * 3 |

TABLE 1-continued

| Frame rate | T1 | N1 |
|---|---|---|
| 90 FPS | G3 * 100 ms | G3 * 9 |
| 120 FPS | G4 * 25 ms | G4 * 3 |

Optionally, the method 1000 may further include: The terminal obtains, based on the first DRX configuration information, a first start offset A1 and a first slot offset that corresponds to the first DRX cycle, where A1≥0. In this case, in a possible implementation of the part 1030, the terminal monitors the PDCCH in the one or more first on-duration periods in the first DRX cycle based on the first cycle duration T1, the quantity N1 of first on-duration periods, the duration of the first on-duration period, the first start offset A1, and the first slot offset.

In the possible implementation in which the terminal monitors the PDCCH in the one or more first on-duration periods in the first DRX cycle based on the first cycle duration T1, the quantity N1 of first on-duration periods, the duration of the first on-duration period, the first start offset A1, and the first slot offset, the terminal obtains start time of the one or more first on-duration periods in the first DRX cycle based on the first cycle duration T1, the quantity N1 of first on-duration periods, the first start offset A1, and the first slot offset, and monitors the PDCCH in the one or more first on-duration periods in the first DRX cycle based on the start time of the one or more first on-duration periods and the duration of the first on-duration period.

For example, the first start offset A1 may be understood as an offset of a start subframe of a 1st on-duration period in the first DRX cycle relative to a first reference point. The first reference point may be a system frame, a subframe, a slot, or a symbol. A unit of the first start offset A1 may be ms, a subframe, a slot, or a granularity (for example, one or more symbols) finer than the slot. A value of the first start offset A1 is an integer greater than or equal to 0. It may be understood that, when the value of the first start offset A1 is 0, it may also be understood as that the start subframe of the 1st on-duration period in the first DRX cycle has no offset relative to the first reference point. The first start offset may also be referred to as an offset of a first start subframe or an offset of a first subframe. A name of the first start offset is not limited in this application.

For example, the first slot offset may be understood as an offset of a start time of an on-duration period in the first DRX cycle relative to start time of a start subframe of the on-duration period. The first slot offset may also be understood as an offset of an on-duration period in the first DRX cycle in a start subframe of the on-duration period. The first slot offset may be in a unit of one or more slots, in a unit of a granularity (for example, one or more symbols) finer than the slot, or in a unit of a millisecond or another time unit. A value of the first slot offset is an integer greater than or equal to 0. It may be understood that, when the value of the first slot offset is 0, it may also be understood that the start time of an on-duration period in the first DRX cycle has no offset relative to the start time of a start subframe of the on-duration period. The first slot offset may also be referred to as an offset in a first subframe, a slot offset in the first subframe, or a slot offset in a first start subframe. A name of the first slot offset is not limited in this application.

The quantity of first on-duration periods in the first DRX cycle is N1. Optionally, a start subframe SF1 of an $i^{th}$ first on-duration period in the first DRX cycle satisfies:

$$((SFN1 \times 10) + SF1) \bmod (T1) = (A1 + \lfloor (i-1) * T1/N1 \rfloor) \bmod (T1); \quad \text{(Formula 1)}$$

$$((SFN1 \times 10) + SF1) \bmod (T1) = (A1 + (i-1) * \lfloor T1/N1 \rfloor) \bmod (T1); \quad \text{(Formula 2)}$$

$$((SFN1 \times 10) + SF1) \bmod (T1) = (A1 + \lceil (i-1) * T1/N1 \rceil) \bmod (T1); \text{ or} \quad \text{(Formula 3)}$$

$$((SFN1 \times 10) + SF1) \bmod (T1) = (A1 + (i-1) * \lceil T1/N1 \rceil) \bmod (T1). \quad \text{(Formula 4)}$$

SF1 represents a number of the start subframe, SFN1 represents a number of a system frame in which the start subframe is located, SF1 and SFN1 are integers greater than or equal to 0, and 1≤i≤N1. Start time of the $i^{th}$ first on-duration period in the first DRX cycle is obtained based on the start subframe and the first slot offset. For example, the first slot offset exists between the start time of the $i^{th}$ first on-duration period in the first DRX cycle and the start time of the start subframe SF1.

It may be understood that a subframe $SF1_{ref}$ satisfying $[(SFN1_{ref} \times 10)+SF1_{ref}]$ modulo (T1)=0 may be understood as the first reference point. $SF1_{ref}$ represents a number of the subframe, $SFN1_{ref}$ represents a number of a system frame in which the subframe is located, and $SF1_{ref}$ and $SFN1_{ref}$ are integers greater than or equal to 0.

In this application, one system frame includes several subframes, one subframe includes one or more slots, and one slot includes one or more symbols.

In the implementation, the on-duration periods may be distributed as evenly as possible in the DRX cycle, so that the on-duration period in the DRX cycle can match an arrival cycle of data (for example, the XR data). In this way, a probability that the terminal misses detecting the PDCCH can be reduced, thereby improving the data receiving and sending performance of the terminal.

The following provides an example of an information element implementation form of a configuration parameter, as shown in the following Table 2.

TABLE 2

```
DRX-Config ::=              SEQUENCE {
drx-onDurationTimer        CHOICE {
                                subMilliSeconds INTEGER (1..31),
                                milliSeconds   ENUMERATED {
                                   ms1, ms2, ms3, ms4, ms5, ms6,
ms8, ms10, ms20, ms30, ms40, ms50, ms60,
                                   ms80, ms100, ms200, ms300,
ms400, ms500, ms600, ms800, ms1000, ms1200,
                                   ms1600, spare8, spare7, spare6,
spare5, spare4, spare3, spare2, spare1 }
                                },
drx-LongCycleStartOffset    CHOICE {
    ms10                        INTEGER(0..9),
    ms20                        INTEGER(0..19),
    ms25                        INTEGER(0..24),
    ms32                        INTEGER(0..31),
    ms40                        INTEGER(0..39),
    ms50                        INTEGER(0..49),
    ms60                        INTEGER(0..59),
    ms64                        INTEGER(0..63),
    ms70                        INTEGER(0..69),
    ms80                        INTEGER(0..79),
    ms100                       INTEGER(0..99),
    ms128                       INTEGER(0..127),
    ms160                       INTEGER(0..159),
```

TABLE 2-continued

| | |
|---|---|
| ms256 | INTEGER(0..255), |
| ms320 | INTEGER(0..319), |
| ms512 | INTEGER(0..511), |
| ms640 | INTEGER(0..639), |
| ms1024 | INTEGER(0..1023), |
| ms1280 | INTEGER(0..1279), |
| ms2048 | INTEGER(0..2047), |
| ms2560 | INTEGER(0..2559), |
| ms5120 | INTEGER(0..5119), |
| ms10240 | INTEGER(0..10239) |
| }, | |
| drx-SlotOffset | INTEGER(0..31) |
| drx-OnDurationNumber | INTEGER(1..16) |

In Table 2, the information element DRX-Config may be understood as the first DRX configuration information, and includes information used for DRX configuration. The information element drx-onDurationTimer may be understood as the information about the duration of the first on-duration period in the first DRX cycle. A value of subMilliSeconds is an integer ranging from 1 to 31, indicating an integer multiple of 1/32 ms. To be specific, when the value of subMilliSeconds is 1, drx-onDurationTimer is 1/32 ms; when the value of subMilliSeconds is 2, drx-onDurationTimer is 2/32 ms; and the rest may be deduced by analogy. A value range of milliSeconds includes a set, where ms1 represents that drx-onDurationTimer is 1 ms, ms2 represents that drx-onDurationTimer is 2 ms, and the rest may be deduced by analogy. Spare1 to spare8 represent eight reserved values, which are not used at present, and are reserved for subsequent version expansion. A value of drx-onDurationTimer is subMilliSeconds or milliSeconds.

The information element drx-LongCycleStartOffset is used to configure a DRX long cycle, and includes two parts of content. One part is the information about the first cycle duration T1 of the first DRX cycle: ms10, ms20, . . . , and ms10240, which respectively represent that the first cycle duration T1 is 10 ms, 20 ms, . . . , and 10240 ms. The other part is information about the first start offset A1: INTEGER(0 . . . 9), INTEGER(0 . . . 19), . . . , and INTEGER (0 . . . 10239), which respectively represent possible values of the first start offset A1 when the first cycle duration T1 is 10 ms, 20 ms, . . . , and 10240 ms.

The information element drx-SlotOffset may be understood as information about the first slot offset, and a possible value of the first slot offset may be, for example, 0 to 31 shown in Table 2.

The information element drx-OnDurationNumber may be understood as the information about the quantity N1 of first on-duration periods in the first DRX cycle, and a possible value of N1 may be, for example, 1 to 16 shown in Table 2.

In another implementation, an offset of a start subframe may be configured for each first on-duration period in the first DRX cycle. For example, an information element drx-OnDurationOffset may be newly added to Table 2, to configure an offset of a start subframe of each first on-duration period in the first DRX cycle. In this configuration manner, a location of an on-duration period in a DRX cycle can be more flexibly adjusted.

Figure 13:
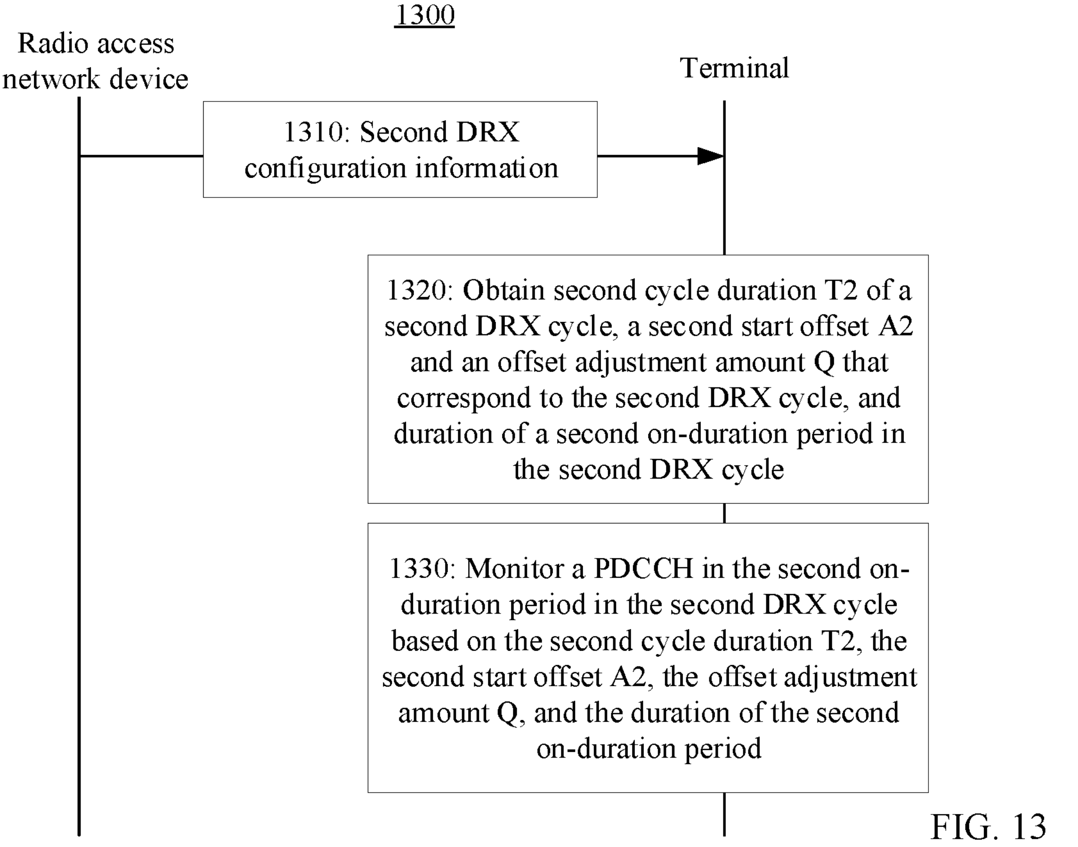
FIG. 13 is a schematic diagram of another DRX configuration method according to an embodiment of this application.

FIG. 13 is a schematic interaction diagram of another DRX configuration method 1300 according to an embodiment of this application. In FIG. 13, the method is illustrated by using an example in which a radio access network device and a terminal perform an interaction. However, an execution body of the interaction is not limited in this application. For example, the radio access network device in FIG. 13 may alternatively be a chip, a chip system, or a processor that supports the radio access network device in implementing the method, or may be a logical module or software that can implement all or some functions of the radio access network device. The terminal in FIG. 13 may alternatively be a chip, a chip system, or a processor that supports the terminal in implementing the method, or may be a logical module or software that can implement all or some functions of the terminal. As shown in FIG. 13, the method 1300 in this embodiment may include a part 1310, a part 1320, and a part 1330.

Part 1310: The radio access network device sends second DRX configuration information to the terminal, and the terminal obtains the second DRX configuration information. It may be understood that the second DRX configuration information is used for DRX configuration. The second DRX configuration information includes information about second cycle duration T2 of a second DRX cycle, information about a second start offset A2 corresponding to the second DRX cycle, information about an offset adjustment amount Q corresponding to the second DRX cycle, and information about a duration of a second on-duration period in the second DRX cycle, where $T2>0$, $A2\geq0$, and $Q\geq0$.

Optionally, the second DRX configuration information is carried in an RRC message.

Optionally, the second cycle duration T2 is 8 ms, 10 ms, 11 ms, 16 ms, 32 ms, 33 ms, an integer multiple of 8 ms, an integer multiple of 10 ms, an integer multiple of 11 ms, an integer multiple of 16 ms, an integer multiple of 32 ms, an integer multiple of 33 ms, or the like.

For example, the second start offset A2 may be understood as an offset of a start subframe of the second DRX cycle relative to a second reference point. The second reference point may be a system frame, a subframe, a slot, or a symbol. A unit of the second start offset A2 may be ms, a subframe, a slot, or a granularity (for example, one or more symbols) finer than the slot. A value of the second start offset A2 is an integer greater than or equal to 0. It may be understood that, when the value of the second start offset A2 is 0, it may also be understood as that the start subframe of the second DRX cycle has no offset relative to the second reference point. The second start offset may also be referred to as an offset of a second start subframe or an offset of a second subframe. A name of the second start offset is not limited in this application.

For example, the offset adjustment amount Q corresponding to the second DRX cycle may be understood as a reference offset of start time of the second on-duration period in the second DRX cycle relative to start time of the second DRX cycle. For example, the offset adjustment amount Q may be understood as a reference offset of the start time of the second on-duration period in the second DRX cycle relative to start time of a $1^{st}$ subframe in the second DRX cycle. A unit of the offset adjustment amount Q may be ms, a subframe, a slot, or a granularity (for example, one or more symbols) finer than the slot. A value of the offset adjustment amount Q is a real number greater than or equal to 0. It may be understood that, when the value of the offset adjustment amount Q is 0, it may also be understood as that the second on-duration period in the second DRX cycle has no offset relative to the $1^{st}$ subframe in the second DRX cycle. The offset adjustment amount may also be referred to as an offset adjustment amount of a start subframe or an offset adjustment amount of a subframe. A name of the offset adjustment amount is not limited in this application.

Optionally, the offset adjustment amount Q is 1/9 ms (0.11 ms), 1/3 ms (0.33 ms), 2/3 ms (0.67 ms), 4/3 ms (1.33 ms), 10/9 ms (1.11 ms), an integer multiple of 1/9 ms, an integer multiple of 1/3 ms, an integer multiple of 2/3 ms, an integer multiple of 4/3 ms, an integer multiple of 10/9 ms, or the like.

Part 1320: The terminal obtains, based on the second DRX configuration information, the second cycle duration T2 of the second DRX cycle, the second start offset A2 and the offset adjustment amount Q that corresponds to the second DRX cycle, and the duration of the second on-duration period in the second DRX cycle.

Part 1330: The terminal monitors a PDCCH in the second on-duration period in the second DRX cycle based on the second cycle duration T2, the second start offset A2, the offset adjustment amount Q, and the duration of the second on-duration period.

According to the method 1300, an on-duration period in a DRX cycle can match an arrival cycle of XR data. In this way, a probability that the terminal misses detecting the PDCCH can be reduced, thereby improving the data receiving and sending performance of the terminal.

Optionally, the method 1300 may further include: The terminal obtains, based on the second DRX configuration information, a second slot offset corresponding to the second DRX cycle. In this case, in a possible implementation of the part 1330, the terminal monitors the PDCCH in the second on-duration period in the second DRX cycle based on the second cycle duration T2, the second start offset A2, the offset adjustment amount Q, the second slot offset, and the duration of the second on-duration period.

In the possible implementation in which the terminal monitors the PDCCH in the second on-duration period in the second DRX cycle based on the second cycle duration T2, the second start offset A2, the offset adjustment amount Q, the second slot offset, and the duration of the second on-duration period, the terminal obtains the start time of the second on-duration period in the second DRX cycle based on the second cycle duration T2, the second start offset A2, the offset adjustment amount Q, and the second slot offset, and monitors the PDCCH in the second on-duration period based on the start time of the second on-duration period and the duration of the second on-duration period.

For example, the second slot offset may be understood as an offset of the start time of the second on-duration period in the second DRX cycle relative to start time of a start subframe of the second on-duration period. The second slot offset may also be understood as an offset of the second on-duration period in the second DRX cycle in the start subframe of the second on-duration period. The second slot offset may be in a unit of one or more slots, in a unit of a granularity (for example, one or more symbols) finer than the slot, or in a unit of a millisecond or another time unit. A value of the second slot offset is an integer greater than or equal to 0. It may be understood, that when the value of the second slot offset is 0, it may also be understood as that the start time of the second on-duration period in the second DRX cycle has no offset relative to the start time of the start subframe of the second on-duration period. The second slot offset may also be referred to as an offset in a second subframe, a slot offset in the second subframe, or a slot offset in a second start subframe. A name of the second slot offset is not limited in this application.

In the method 1300, optionally, the second DRX cycle is identified by a positive integer j, and the start subframe of the second on-duration period in the second DRX cycle satisfies:

$$((SFN2\times 10)+SF2) \bmod (T2) = (A2+\lfloor (j-1)*Q\rfloor) \bmod (T2); \quad \text{(Formula 5)}$$

$$((SFN2\times 10)+SF2) \bmod (T2) = \lfloor A2+(j-1)*Q\rfloor \bmod (T2); \quad \text{(Formula 6)}$$

$$((SFN2\times 10)+SF2) \bmod (T2) = (A2+\lceil (j-1)*Q\rceil) \bmod (T2); \text{ or} \quad \text{(Formula 7)}$$

$$((SFN2\times 10)+SF2) \bmod (T2) = \lceil A2+(j-1)*Q\rceil \bmod (T2). \quad \text{(Formula 8)}$$

SF2 represents a number of the start subframe, SFN2 represents a number of a system frame in which the start subframe is located, and SF2 and SFN2 are integers greater than or equal to 0. The start time of the second on-duration period in the second DRX cycle is obtained based on the start subframe and the second slot offset. For example, the second slot offset exists between the start time of the second on-duration period in the second DRX cycle and the start time of the start subframe SF2.

It may be understood that a subframe $SF2_{ref}$ satisfying $[(SFN2_{ref}\times 10)+SF2_{ref}]$ modulo (T2)=0 may be understood as the second reference point. $SF2_{ref}$ represents a number of the subframe, $SFN2_{ref}$ represents a number of a system frame in which the subframe is located, and $SF2_{ref}$ and $SFN2_{ref}$ are integers greater than or equal to 0.

In the implementation, the on-duration periods may be distributed as evenly as possible in the DRX cycle, so that the on-duration period in the DRX cycle can match an arrival cycle of data (for example, the XR data). In this way, a probability that the terminal misses detecting the PDCCH can be reduced, thereby improving the data receiving and sending performance of the terminal.

For different frame rates, the foregoing implementation is used and a proper parameter is configured for DRX, so that the on-duration periods in the DRX cycle can be distributed as evenly as possible in the DRX cycle, and the on-duration period in the DRX cycle can match the arrival cycle of the data (for example, the XR data). The following provides examples of possible configuration manners at several frame rates.

For example, a picture frame of a service whose frame rate is 60 FPS is used as an example. One picture frame appears or arrives at a spacing of 1000/60≈16.67 ms, and one interframe spacing 16.67 ms is not an integer. In a possible configuration manner, because a maximum integer less than 16.67 is 16, the second cycle duration T2 of the second DRX cycle may be configured as 16 ms; and because a difference between the interframe spacing and the second cycle duration T2 is 2/3 ms (0.67 ms), the offset adjustment amount Q may be configured as 2/3 ms (0.67 ms).

For another example, a picture frame of a service whose frame rate is 30 FPS is used as an example. One picture frame appears or arrives at a spacing of 1000/30≈33.33 ms, and one interframe spacing 33.33 ms is not an integer. In a possible configuration manner, because a maximum integer less than 33.33 is 33, the second cycle duration T2 of the second DRX cycle may be configured as 33 ms; and because a difference between the interframe spacing and the second cycle duration T2 is 1/3 ms (0.33 ms), the offset adjustment amount Q may be configured as 1/3 ms (0.33 ms). In another possible configuration manner, the second cycle duration T2 of the second DRX cycle may be configured as 32 ms (where the value is obtained by subtracting 1 from a maximum integer less than 33.33), and the offset adjustment amount Q is configured as 4/3 ms (1.33 ms).

For another example, a picture frame of a service whose frame rate is 90 FPS is used as an example. One picture frame appears or arrives at a spacing of 1000/90≈11.11 ms, and one interframe spacing 11.11 ms is not an integer. In a possible configuration manner, because a maximum integer less than 11.11 is 11, the second cycle duration T2 of the second DRX cycle may be configured as 11 ms; and because a difference between the interframe spacing and the second cycle duration T2 is 1/9 ms (0.11 ms), the offset adjustment amount Q may be configured as 1/9 ms (0.11 ms). In another possible configuration manner, the second cycle duration T2 of the second DRX cycle may be configured as 10 ms (where the value is obtained by subtracting 1 from a maximum integer less than 11.11), and the offset adjustment amount Q is configured as 10/9 ms (1.11 ms).

For another example, a picture frame of a service whose frame rate is 120 FPS is used as an example. One picture frame appears or arrives at a spacing of 1000/120≈8.33 ms, and one interframe spacing 8.33 ms is not an integer. In a possible configuration manner, because a maximum integer less than 8.33 is 8, the second cycle duration T2 of the second DRX cycle may be configured as 8 ms; and because a difference between the interframe spacing and the second cycle duration T2 is 1/3 ms (0.33 ms), the offset adjustment amount Q may be configured as 1/3 ms (0.33 ms).

The following Table 3 schematically provides configurations of T2 and Q at several frame rates.

TABLE 3

| Frame rate | T2 | Q |
|---|---|---|
| 30 FPS | 33 ms | 1/3 ms |
| | 32 ms | 4/3 ms |
| 60 FPS | 16 ms | 2/3 ms |
| 90 FPS | 11 ms | 1/9 ms |
| | 10 ms | 10/9 ms |
| 120 FPS | 8 ms | 1/3 ms |

The following provides an example of an information element implementation form of a configuration parameter, as shown in the following Table 4.

TABLE 4

```
DRX-Config ::=                SEQUENCE {
drx-onDurationTimer          CHOICE {
                                  subMilliSeconds INTEGER
                                  (1..31),
                                  milliSeconds   ENUMERATED {
                                    ms1, ms2, ms3, ms4, ms5, ms6,
ms8, ms10, ms20, ms30, ms40, ms50, ms60,
                                    ms80, ms100, ms200, ms300,
ms400, ms500, ms600, ms800, ms1000, ms1200,
                                    ms1600, spare8, spare7, spare6,
spare5, spare4, spare3, spare2, spare1 }
                                  },
drx-LongCycleStartOffset     CHOICE {
    ms8                           INTEGER(0..7),
    ms10                          INTEGER(0..9),
    ms11                          INTEGER(0..7),
    ms16                          INTEGER(0..15),
    ms20                          INTEGER(0..19),
    ms32                          INTEGER(0..31),
    ms33                          INTEGER(0..32),
    ms40                          INTEGER(0..39),
    ms60                          INTEGER(0..59),
    ms64                          INTEGER(0..63),
    ms70                          INTEGER(0..69),
    ms80                          INTEGER(0..79),
    ms128                         INTEGER(0..127),
    ms160                         INTEGER(0..159),
    ms256                         INTEGER(0..255),
    ms320                         INTEGER(0..319),
    ms512                         INTEGER(0..511),
```

TABLE 4-continued

```
    ms640                         INTEGER(0..639),
    ms1024                        INTEGER(0..1023),
    ms1280                        INTEGER(0..1279),
    ms2048                        INTEGER(0..2047),
    ms2560                        INTEGER(0..2559),
    ms5120                        INTEGER(0..5119),
    ms10240                       INTEGER(0..10239)
},
shortDRX                          SEQUENCE {
    drx-ShortCycle                  ENUMERATED {
                                      ms2, ms3, ms4, ms5, ms6, ms7,
ms8, ms10, ms11, ms14, ms16, ms20, ms30, ms32, ms33
                                      ms35, ms40, ms64, ms80,
ms128, ms160, ms256, ms320, ms512, ms640, spare9,
                                      spare8, spare7, spare6, spare5,
spare4, spare3, spare2, spare1 },
    drx-ShortCycle Timer            INTEGER (1..16)
  }                               OPTIONAL,
drx-SlotOffset                    INTEGER(0..31)
drx-SubframeOffset                CHOICE {ms1/9, ms1/3, ms2/3, ms4/3,
ms10/9},
```

In Table 4, the information element DRX-Config may be understood as the second DRX configuration information, and includes information used for DRX configuration. The information element drx-onDurationTimer may be understood as the information about the duration of the second on-duration period in the second DRX cycle. For a meaning of a parameter, refer to descriptions in Table 2.

The information element drx-LongCycleStartOffset is used to configure a DRX long cycle, and includes two parts of content. One part is the information about the second cycle duration T2 of the second DRX cycle: ms8, ms10, . . . , and ms10240, which respectively represent that the second cycle duration T2 is 8 ms, 10 ms, . . . , and 10240 ms. The other part is the information about the second start offset A2: INTEGER(0 . . . 7), INTEGER(0 . . . 9), . . . , and INTEGER(0 . . . 10239), which respectively represent possible values of the second start offset A2 when the second cycle duration T2 is 8 ms, 10 ms, . . . , and 10240 ms.

The information element shortDRX is used to configure a DRX short cycle, and includes the information elements drx-ShortCycle and drx-ShortCycleTimer. The information element drx-ShortCycle is used to configure cycle duration of the DRX short cycle, and may also be used as the information about the second cycle duration T2 of the second DRX cycle. The information element drx-ShortCycleTimer is used to configure a quantity of DRX short cycles, and a possible value may be, for example, 1 to 16 shown in Table 4.

The information element drx-SlotOffset may be understood as information about the second slot offset, and a possible value of the second slot offset may be, for example, 0 to 31 shown in Table 4.

The information element drx-SubframeOffset may be understood as the information about the offset adjustment amount Q, and a possible value of Q may be, for example, 1/9 ms, 1/3 ms, 2/3 ms, 4/3 ms, or 10/9 ms shown in Table 4.

Corresponding to the method provided in the foregoing method embodiments, embodiments of this application further provide a corresponding apparatus, including corresponding modules configured to execute the foregoing embodiments. The module may be software, hardware, or a combination of software and hardware.

Figure 14:
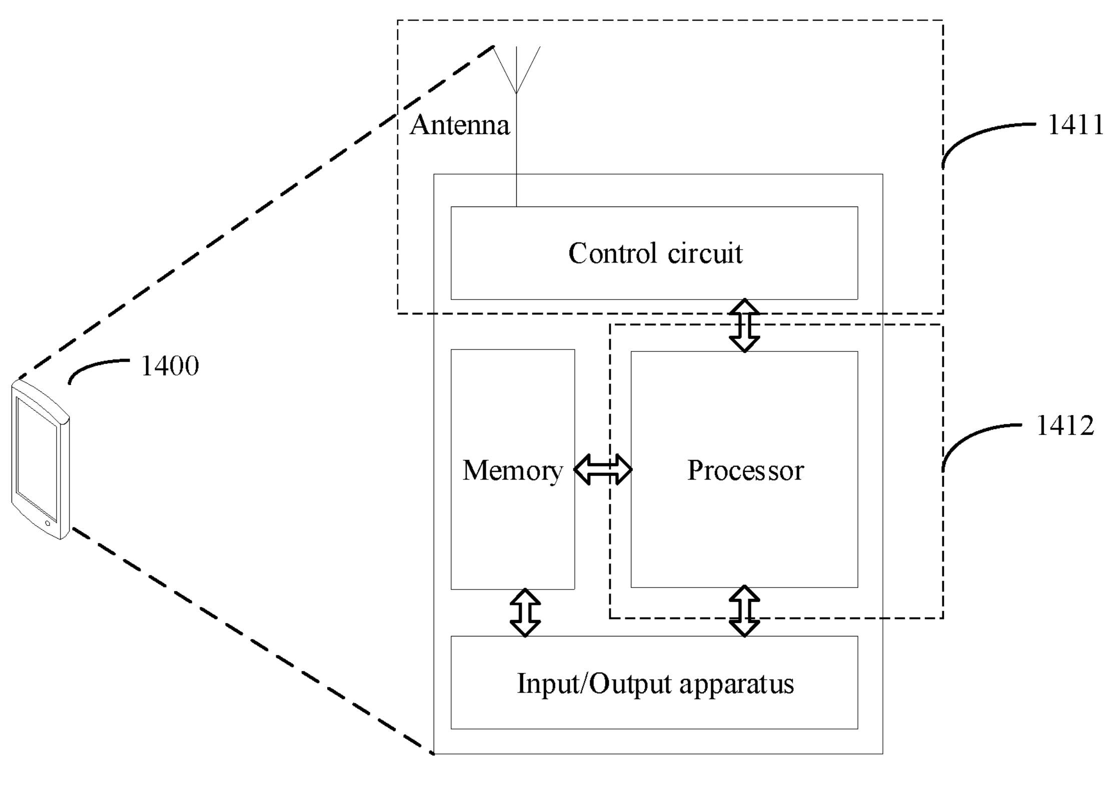
FIG. 14 is a schematic diagram of a structure of a terminal according to an embodiment of this application.

FIG. 14 is a schematic diagram of a structure of a terminal. The terminal is applicable to the scenario shown in FIG. 1, FIG. 2, FIG. 3, FIG. 4, or FIG. 5. The terminal or a component in the terminal may perform the foregoing method 1000 and various possible implementations, or may perform the foregoing method 1300 and various possible implementations. For ease of description, FIG. 14 shows only main components of the terminal. As shown in FIG. 14, the terminal 1400 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to: receive and send the radio frequency signal in an electromagnetic wave form. The input/output apparatus, for example, a touchscreen, a display, or a keyboard, is mainly configured to: receive data input by a user and output data to the user.

After the terminal is powered on, the processor may read a software program in a storage unit, interpret and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in the electromagnetic wave form through the antenna. When data is sent to the terminal, the radio frequency circuit receives the radio frequency signal through the antenna, further converts the radio frequency signal into the baseband signal, and outputs the baseband signal to the processor. The processor converts the baseband signal into the data, and processes the data.

For ease of description, FIG. 14 shows only one memory and one processor. In an actual terminal, there may be a plurality of processors and memories. The memory may also be referred to as a storage medium, a storage device, or the like. This is not limited in embodiments of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 14 integrates functions of the baseband processor and the central processing unit. A person skilled in the art may understand that the baseband processor and the central processing unit may alternatively be separate processors, and are interconnected by using a technology such as a bus. A person skilled in the art may understand that the terminal may include a plurality of baseband processors to adapt to different network standards, the terminal may include a plurality of central processing units to enhance a processing capability, and components of the terminal may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor; or may be stored in the storage unit in a form of the software program, and the processor executes the software program to implement a baseband processing function.

In an example, the antenna and the control circuit that have sending and receiving functions may be considered as a transceiver unit 1411 of the terminal 1400, and the processor having a processing function may be considered as a processing unit 1412 of the terminal 1400. As shown in FIG. 14, the terminal 1400 includes the transceiver unit 1411 and the processing unit 1412. The transceiver unit may also be referred to as a transceiver, a transceiver machine, a transceiver apparatus, or the like. Optionally, a component that is in the transceiver unit 1411 and that is configured to implement the receiving function may be considered as a receiving unit, and a component that is in the transceiver unit 1411 and that is configured to implement the sending function may be considered as a sending unit. That is, the transceiver unit 1411 includes the receiving unit and the sending unit. For example, the receiving unit may also be referred to as a receiver, a receiving machine, or a receiving circuit, and the sending unit may also be referred to as a transmitter, a transmitting machine, or a transmitting circuit. Optionally, the receiving unit and the sending unit may be one integrated unit, or may be a plurality of independent units. The receiving unit and the sending unit may be at one geographical location, or may be distributed at a plurality of geographical locations.

Figure 15:
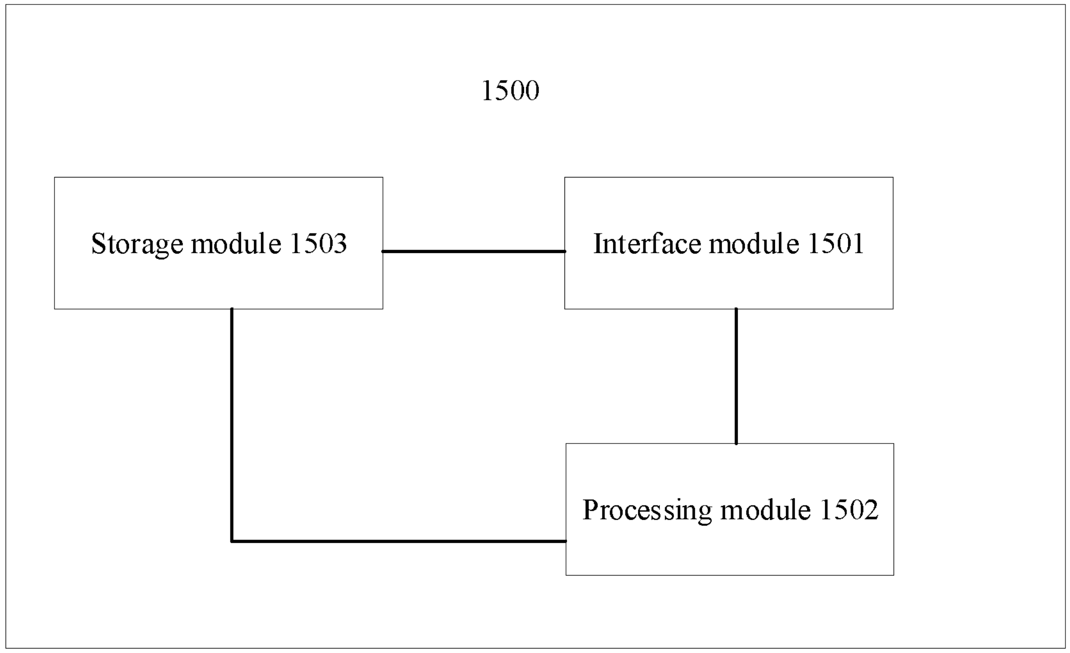
FIG. 15 is a schematic diagram of a structure of an apparatus according to an embodiment of this application.

As shown in FIG. 15, another embodiment of this application provides an apparatus 1500. The apparatus may be a terminal, or may be a component (for example, an integrated circuit or a chip) of the terminal. Alternatively, the apparatus may be a radio access network device, a component (for example, an integrated circuit or a chip) of the network device, or a logical module or software that can implement all or some functions of the radio access network device. The apparatus may alternatively be another communication module. For example, the apparatus 1500 may implement the functions of the radio access network device in the method 1000 or the method 1300, or the apparatus 1500 may implement functions of the terminal in the method 1000 or the method 1300. The apparatus 1500 may include a processing module 1502 (or referred to as a processing unit). Optionally, the apparatus may further include an interface module 1501 (or referred to as an interface unit) and a storage module 1503 (or referred to as a storage unit).

In a possible design, one or more modules in FIG. 15 may be implemented by one or more processors, implemented by one or more processors and one or more memories, implemented by one or more processors and one or more transceivers, or implemented by one or more processors, one or more memories, and one or more transceivers. This is not limited in this embodiment of this application. The processor, the memory, and the transceiver may be separately disposed, or may be integrated.

The apparatus has a function of implementing the terminal described in embodiments of this application. For example, the apparatus includes a corresponding module, unit, or means used by the terminal to perform the steps that are related to the terminal and that are described in embodiments of this application. The function, the unit, or the means may be implemented by software or hardware, implemented by hardware executing corresponding software, or implemented by a combination of software and hardware. For details, further refer to the corresponding descriptions in the foregoing corresponding method embodiments. Alternatively, the apparatus has a function of implementing the radio access network device described in embodiments of this application. For example, the apparatus includes a corresponding module, unit, or means used by the radio access network device to perform the steps that are related to the radio access network device and that are described in embodiments of this application. The function, the unit, or the means may be implemented by software or hardware, implemented by hardware executing corresponding software, or implemented by a combination of software and hardware. For details, further refer to the corresponding descriptions in the foregoing corresponding method embodiments.

In a possible design, the apparatus 1500 includes the processing module 1502 and the interface module 1501. The interface module 1501 is configured to obtain first DRX configuration information. The processing module 1502 is configured to obtain first cycle duration T1 of a first DRX cycle, a quantity N1 of first on-duration periods in the first DRX cycle, and duration of the first on-duration period based on the first DRX configuration information, where T1>0 and N1>0. The processing module 1502 is further configured to control, based on the first cycle duration T1, the quantity N1 of first on-duration periods, and the duration of the first on-duration period, the apparatus 1500 to monitor a PDCCH in one or more first on-duration periods in the first DRX cycle.

Optionally, the first DRX configuration information is carried in a radio resource control RRC message.

Optionally, the first cycle duration T1 is 25 ms, 50 ms, 100 ms, an integer multiple of 25 ms, an integer multiple of 50 ms, an integer multiple of 100 ms, or the like.

Optionally, the quantity N1 of first on-duration periods is an integer multiple of 3. For example, N1 may be 3, 6, or 9.

In some possible implementations of the apparatus 1500, the processing module 1502 is further configured to obtain, based on the first DRX configuration information, a first start offset A1 and a first slot offset that corresponds to the first DRX cycle, where A1≥0. That the processing module 1502 is configured to control, based on the first cycle duration T1, the quantity N1 of first on-duration periods, and the duration of the first on-duration period, the apparatus 1500 to monitor a PDCCH in one or more first on-duration periods in the first DRX cycle includes: The processing module 1502 is configured to control, based on the first cycle duration T1, the quantity N1 of first on-duration periods, the duration of the first on-duration period, the first start offset A1, and the first slot offset, the apparatus 1500 to monitor the PDCCH in the one or more first on-duration periods in the first DRX cycle.

In some possible implementations of the apparatus 1500, that the processing module 1502 is configured to control, based on the first cycle duration T1, the quantity N1 of first on-duration periods, the duration of the first on-duration period, the first start offset A1, and the first slot offset, the apparatus 1500 to monitor the PDCCH in the one or more first on-duration periods in the first DRX cycle includes: The processing module 1502 is configured to: obtain a start time of the one or more first on-duration periods in the first DRX cycle based on the first cycle duration T1, the quantity N1 of first on-duration periods, the first start offset A1, and the first slot offset; and control, based on the start time of the one or more first on-duration periods and the duration of the first on-duration period, the apparatus 1500 to monitor the PDCCH in the one or more first on-duration periods in the first DRX cycle.

Optionally, a start subframe of an $i^{th}$ first on-duration period in the first DRX cycle satisfies:

$$((SFN1\times 10)+SF1)\bmod(T1)=(A1+\lfloor(i-1)*T1/N1\rfloor)\bmod(T1);$$

$$((SFN1\times 10)+SF1)\bmod(T1)=(A1+(i-1)*\lfloor T1/N1\rfloor)\bmod(T1);$$

$$((SFN1\times 10)+SF1)\bmod(T1)=(A1+\lceil(i-1)*T1/N1\rceil)\bmod(T1);\text{ or}$$

$$((SFN1\times 10)+SF1)\bmod(T1)=(A1+(i-1)*\lceil T1/N1\rceil)\bmod(T1).$$

SF1 represents a number of the start subframe, SFN1 represents a number of a system frame in which the start subframe is located, SF1 and SFN1 are integers greater than or equal to 0, and 1≤i≤N1. Start time of the $i^{th}$ first on-duration period in the first DRX cycle is obtained based on the start subframe and the first slot offset. For example, the first slot offset exists between the start time of the $i^{th}$ first on-duration period in the first DRX cycle and the start time of the start subframe SF1.

In another possible design, the apparatus 1500 includes the processing module 1502 and the interface module 1501. The interface module 1501 is configured to obtain second discontinuous reception DRX configuration information. The processing module 1502 is configured to obtain, based on the second DRX configuration information, second cycle duration T2 of a second DRX cycle, a second start offset A2 and an offset adjustment amount Q that corresponds to the second DRX cycle, and a duration of a second on-duration period in the second DRX cycle, where T2>0, A2≥0, and Q≥0. The processing module 1502 is further configured to control, based on the second cycle duration T2, the second start offset A2, the offset adjustment amount Q, and the duration of the second on-duration period, the apparatus 1500 to monitor a PDCCH in the second on-duration period in the second DRX cycle.

Optionally, the second DRX configuration information is carried in an RRC message.

Optionally, the second cycle duration T2 is 8 ms, 10 ms, 11 ms, 16 ms, 32 ms, 33 ms, an integer multiple of 8 ms, an integer multiple of 10 ms, an integer multiple of 11 ms, an integer multiple of 16 ms, an integer multiple of 32 ms, an integer multiple of 33 ms, or the like.

Optionally, the offset adjustment amount Q is 1/9 ms (0.11 ms), 1/3 ms (0.33 ms), 2/3 ms (0.67 ms), 4/3 ms (1.33 ms), 10/9 ms (1.11 ms), an integer multiple of 1/9 ms, an integer multiple of 1/3 ms, an integer multiple of 2/3 ms, an integer multiple of 4/3 ms, an integer multiple of 10/9 ms, or the like.

In some possible implementations of the apparatus 1500, the processing module 1502 is further configured to obtain, based on the second DRX configuration information, a second slot offset corresponding to the second DRX cycle. That the processing module 1502 is configured to control, based on the second cycle duration T2, the second start offset A2, the offset adjustment amount Q, and the duration of the second on-duration period, the apparatus 1500 to monitor a PDCCH in the second on-duration period in the second DRX cycle includes: The processing module 1502 is configured to control, based on the second cycle duration T2, the second start offset A2, the offset adjustment amount Q, the second slot offset, and the duration of the second on-duration period, the apparatus 1500 to monitor the PDCCH in the second on-duration period in the second DRX cycle.

In some possible implementations of the apparatus 1500, that the processing module 1502 is configured to control, based on the second cycle duration T2, the second start offset A2, the offset adjustment amount Q, the second slot offset, and the duration of the second on-duration period, the apparatus 1500 to monitor the PDCCH in the second on-duration period in the second DRX cycle includes: The processing module 1502 is configured to: obtain a start time of the second on-duration period in the second DRX cycle based on the second cycle duration T2, the second start offset A2, the offset adjustment amount Q, and the second slot offset; and control, based on the start time of the second on-duration period and the duration of the second on-duration period, the apparatus 1500 to monitor the PDCCH in the second on-duration period in the second DRX cycle.

Optionally, the second DRX cycle is identified by a positive integer j, and a start subframe of the second on-duration period in the second DRX cycle satisfies:

$$((SFN2\times 10)+SF2)\bmod(T2)=(A2+\lfloor(j-1)*Q\rfloor)\bmod(T2);$$

$$((SFN2\times 10)+SF2)\bmod(T2)=\lfloor A2+(j-1)*Q\rfloor\bmod(T2);$$

$$((SFN2\times 10)+SF2)\bmod(T2)=(A2+\lceil(j-1)*Q\rceil)\bmod(T2);\text{ or}$$

$$((SFN2\times 10)+SF2)\bmod(T2)=\lceil A2+(j-1)*Q\rceil\bmod(T2).$$

SF2 represents a number of the start subframe, SFN2 represents a number of a system frame in which the start subframe is located, and SF2 and SFN2 are integers greater than or equal to 0. The start time of the second on-duration period in the second DRX cycle is obtained based on the start subframe and the second slot offset. For example, the second slot offset exists between the start time of the second on-duration period in the second DRX cycle and the start time of the start subframe SF2.

It may be understood that, for beneficial effects corresponding to the apparatus 1500 and various possible implementations, refer to the descriptions in the foregoing method embodiments. Details are not described herein again.

Optionally, the apparatus 1500 may further include the storage module 1503, configured to store data or instructions (which may also be referred to as code or a program). The other module may interact with or be coupled to the storage module, to implement a corresponding method or function. For example, the processing module 1502 may read the data or the instructions in the storage module 1503, so that the apparatus 1500 implements the method in the foregoing embodiments.

For example, the module in the apparatus may be one or more integrated circuits configured to implement the foregoing method, for example, one or more application-specific integrated circuits (ASICs), one or more microprocessors (DSPs), one or more field programmable gate arrays (FPGAs), or a combination of at least two of these integrated circuit forms. For another example, when the module in the apparatus may be implemented by scheduling a program by a processing element, the processing element may be a general-purpose processor, for example, a central processing unit (CPU) or another processor that can invoke the program. For another example, the units may be integrated and implemented in a form of a system-on-a-chip (SoC).

Figure 16:
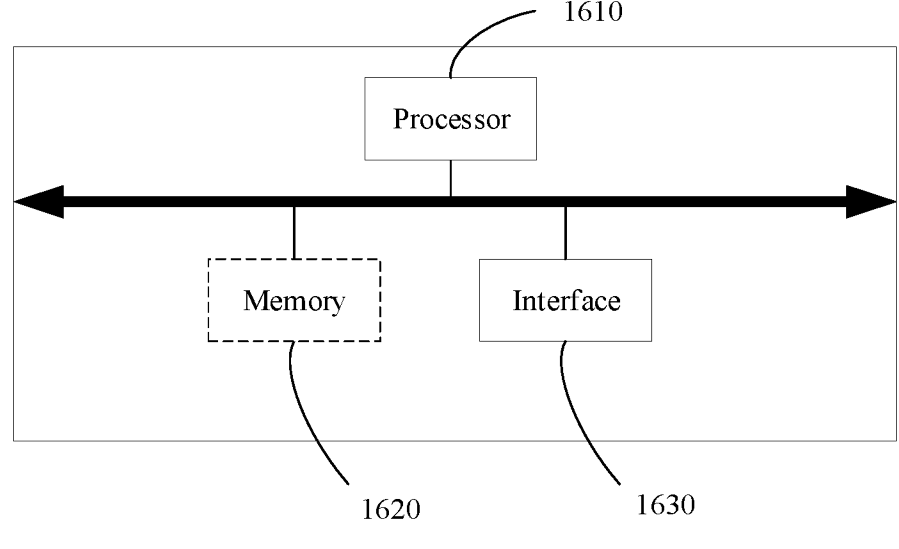
FIG. 16 is a schematic diagram of another apparatus according to an embodiment of this application.

FIG. 16 is a schematic diagram of an apparatus according to an embodiment of this application. The apparatus may be configured to implement the foregoing method 1000 and various possible implementations, or may be configured to implement the foregoing method 1300 and various possible implementations. As shown in FIG. 16, the apparatus includes a processor 1610 and an interface 1630, and the processor 1610 is coupled to the interface 1630. The interface 1630 is configured to implement communication with another module or device. The interface 1630 may be a transceiver or an input/output interface. The interface 1630 may be, for example, an interface circuit. Optionally, the apparatus further includes a memory 1620, configured to store instructions executed by the processor 1610, store input data for the processor 1610 to run the instructions, or store data generated after the processor 1610 runs the instructions.

The method 1000, the method 1300, and various possible implementations may be implemented by the processor 1610 by invoking a program or the instructions stored in the memory 1620. The memory 1620 may be inside the apparatus, or may be outside the apparatus. This is not limited in this application.

Optionally, functions/implementation processes of the interface module 1501 and the processing module 1502 in FIG. 15 may be implemented by using the processor 1610 in the apparatus shown in FIG. 16. Alternatively, a function/implementation process of the processing module 1502 in FIG. 15 may be implemented by using the processor 1610 in the apparatus shown in FIG. 16, and a function/implementation process of the interface module 1501 in FIG. 15 may be implemented by the interface 1630 in the apparatus shown in FIG. 16. For example, the function/implementation process of the interface module 1501 may be implemented by the processor by invoking the program instructions in the memory to drive the interface 1630.

When the foregoing apparatus is a chip used in a terminal, the terminal chip implements functions of the terminal in the foregoing method embodiments. The chip receives information from another module (for example, a radio frequency module or an antenna) in the terminal, where the information is from another terminal or a radio access network device; or the chip sends information to another module (for example, a radio frequency module or an antenna) in the terminal, where the information is sent by the terminal to another terminal or a radio access network device.

When the apparatus is a chip used in a radio access network device, the chip implements functions of the radio access network device in the foregoing method embodiments. The chip receives information from another module (for example, a radio frequency module or an antenna) in the radio access network device, where the information is from another radio access network device or a terminal; or the chip sends information to another module (for example, a radio frequency module or an antenna) in the radio access network device, where the information is sent by the radio access network device to another radio access network device or a terminal.

A person of ordinary skill in the art may understand that various numbers such as first and second in this application are merely used for differentiation for ease of description, and are not used to limit the scope of embodiments of this application or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. "At least two" means two or more. "At least one", "any one", or a similar expression thereof indicates any combination of the items, and includes a singular item (piece) or any combination of plural items (pieces). For example, at least one of a, b, or c may indicate: a, b, c, a and b, a and c, b and c, or a, b, and c, where a, b, and c may be singular or plural. "A plurality of" means two or more, and another quantifier is similar to this.

It should be understood that sequence numbers of the foregoing processes do not mean execution sequences in various embodiments of this application. The execution sequences of the processes should be determined based on functions and internal logic of the processes, and should not constitute any limitation on implementation processes of embodiments of this application.

All or some of the foregoing embodiments may be implemented by using software, hardware, firmware, or any combination thereof. When the software is used to implement embodiments, the all or some of embodiments may be implemented in a form of a computer program product. The computer program product includes one or more computer instructions. When the computer program instructions are loaded and executed on a computer, all or some of procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, a fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Steps of the methods described in embodiments of this application may be directly embedded into hardware, a software unit executed by a processor, or a combination thereof. The software unit may be stored in a random access memory (RAM), a flash memory, a read-only memory (ROM), a register, a hard disk, a removable disk, or a storage medium in any other form in the art. For example, a storage medium may be connected to the processor, so that the processor can read information from the storage medium and can write information into the storage medium. Optionally, the storage medium may alternatively be integrated into the processor. The processor and the storage medium may be disposed in an ASIC.

This application further provides a computer-readable medium. The computer-readable medium stores a computer program, and when the computer program is executed by a computer, a function of any one of the foregoing method embodiments is implemented.

This application further provides a computer program product. When the computer program product is executed by a computer, a function of any one of the foregoing method embodiments is implemented.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing descriptions are implementations of this application, but are not intended to limit the protection scope of this application.

The foregoing descriptions are merely specific implementations of this application. However, the protection scope of this application is not limited thereto. Any change or replacement readily figured out by a person skilled in the art within the technical scope disclosed in this application shall fall within the protection scope of this application.

What is claimed is:

1. A communication method, comprising:

obtaining first discontinuous reception (DRX) configuration information;

obtaining a first cycle duration T1 of a first DRX cycle, a quantity N1 of first on-duration periods in the first DRX cycle, and a duration of one first on-duration period of the N1 first on-duration periods based on the first DRX configuration information, wherein T1>0 and N1>0 and T1 and N1 are positive integers;

obtaining, based on the first DRX configuration information, a first start offset A1 and a first slot offset that correspond to the first DRX cycle, wherein A1≥0 and A1 is an integer; and obtaining start times of one or more first on-duration periods of the N1 first on-duration periods based on the first cycle duration T1, the quantity N1 of first on-duration periods, the first start offset A1, and the first slot offset;

wherein a start subframe of an $i^{th}$ first on-duration period of the N1 first on-duration periods in the first DRX cycle satisfies:

$((SFN1\times10)+SF1) \bmod (T1)=(A1+\lfloor(i-1)*T1/N1\rfloor) \bmod (T1)$, wherein SF1 represents a number of the start subframe, SFN1 represents a number of a system frame in which the start subframe is located, SF1 and SFN1 are integers greater than or equal to 0, $1\le i\le N1$, mod represents a modulo operation, and $\lfloor\ \rfloor$ represents rounding down;

a start time of the $i^{th}$ first on-duration period is obtained based on the start subframe and the first slot offset; and monitoring a physical downlink control channel (PDCCH) in the one or more first on-duration periods based on the first cycle duration T1, the quantity N1 of first on-duration periods, the first start offset A1 and the first slot offset, the start times of the one or more first on-duration periods, and the duration of the one first on-duration period.

2. The method according to claim 1, wherein the first cycle duration T1 is 25 milliseconds (ms), 50 ms, or 100 ms.

3. The method according to claim 1, wherein N1 is an integer multiple of 3.

4. An apparatus, comprising:

one or more processors to execute instructions stored in a non-transitory memory that when executed cause the apparatus to:

obtain first discontinuous reception (DRX) configuration information;

obtain a first cycle duration T1 of a first DRX cycle, a quantity N1 of first on-duration periods in the first DRX cycle, and a duration of one first on-duration period of the N1 first on-duration periods based on the first DRX configuration information, wherein T1>0 and N1>0 and T1 and N1 are positive integers;

obtain, based on the first DRX configuration information, a first start offset A1 and a first slot offset that correspond to the first DRX cycle, wherein A1≥0 and A1 is an integer; and obtain start times of one or more first on-duration periods of the N1 first on-duration periods based on the first cycle duration T1, the quantity N1 of first on-duration periods, the first start offset A1, and the first slot offset;

wherein a start subframe of an $i^{th}$ first on-duration period of the N1 first on-duration periods in the first DRX cycle satisfies:

$((SFN1 \times 10)+SF1) \bmod (T1)=(A1+(i-1)*\lfloor T1/N1 \rfloor) \bmod (T1)$, wherein SF1 represents a number of the start subframe, SFN1 represents a number of a system frame in which the start subframe is located, SF1 and SFN1 are integers greater than or equal to 0, 1≤i≤N1, mod represents a modulo operation, and ⌊ ⌋ represents rounding down;

a start time of the $i^{th}$ first on-duration period is obtained based on the start subframe and the first slot offset; and monitor a physical downlink control channel (PDCCH) in the one or more first on-duration periods based on the first cycle duration T1, the quantity N1 of first on-duration periods, the first start offset A1 and the first slot offset, the start times of the one or more first on-duration periods, and the duration of the one first on-duration period.

5. The apparatus according to claim 4, wherein the first cycle duration T1 is 25 milliseconds (ms), 50 ms, or 100 ms.

6. The apparatus according to claim 4, wherein N1 is an integer multiple of 3.

7. A non-transitory computer readable medium storing instructions that are executable by a computer, the non-transitory computer readable medium is applied to a first communication apparatus, and the instructions comprise instructions for:

obtaining first discontinuous reception (DRX) configuration information;

obtaining a first cycle duration T1 of a first DRX cycle, a quantity N1 of first on-duration periods in the first DRX cycle, and a duration of one first on-duration period of the N1 first on-duration periods based on the first DRX configuration information, wherein T1>0 and N1>0 and T1 and N1 are positive integers;

obtaining, based on the first DRX configuration information, a first start offset A1 and a first slot offset that correspond to the first DRX cycle, wherein A1≥0 and A1 is an integer; and obtaining start times of one or more first on-duration periods of the N1 first on-duration periods based on the first cycle duration T1, the quantity N1 of first on-duration periods, the first start offset A1, and the first slot offset;

wherein a start subframe of an $i^{th}$ first on-duration period of the N1 first on-duration periods in the first DRX cycle satisfies:

$((SFN1 \times 10)+SF1) \bmod (T1)=(A1+\lfloor (i-1)*T1/N1 \rfloor) \bmod (T1)$, wherein SF1 represents a number of the start subframe, SFN1 represents a number of a system frame in which the start subframe is located, SF1 and SFN1 are integers greater than or equal to 0, 1≤i≤N1, mod represents a modulo operation, and ⌊ ⌋ represents rounding down;

a start time of the $i^{th}$ first on-duration period is obtained based on the start subframe and the first slot offset; and monitoring a physical downlink control channel (PDCCH) in one or more first on-duration periods of the first on-duration periods in the first DRX cycle based on the first cycle duration T1, the quantity N1 of first on-duration periods, the first start offset A1 and the first slot offset, the start times of the one or more first on-duration periods, and the duration of the one first on-duration period.

8. The non-transitory computer readable medium according to claim 7, wherein the first cycle duration T1 is 25 milliseconds (ms), 50 ms, or 100 ms.

9. The non-transitory computer readable medium according to claim 7, wherein N1 is an integer multiple of 3.

* * * * *